(12) United States Patent
Ishii et al.

(10) Patent No.: US 9,387,767 B2
(45) Date of Patent: Jul. 12, 2016

(54) VEHICLE WITH AN ELECTRIC STORAGE SECTION, AND CHARGE-DISCHARGE SYSTEM INCLUDING THE VEHICLE AND AN ENERGY MANAGEMENT EQUIPMENT

(75) Inventors: Daisuke Ishii, Toyota (JP); Shigeki Kinomura, Shizuoka-ken (JP); Tomoyuki Mizuno, Toyota (JP); Takashi Ogawa, Kariya (JP); Hiroki Sawada, Toyota (JP); Yasuo Suzuki, Nagoya (JP)

(73) Assignee: Toyota Jidosha Kabushiki Kaisha, Toyota-shi, Aichi (JP)

( * ) Notice: Subject to any disclaimer, the term of this patent is extended or adjusted under 35 U.S.C. 154(b) by 255 days.

(21) Appl. No.: 14/355,034

(22) PCT Filed: Jul. 31, 2012

(86) PCT No.: PCT/JP2012/069933
§ 371 (c)(1),
(2), (4) Date: Jul. 22, 2014

(87) PCT Pub. No.: WO2013/065374
PCT Pub. Date: May 10, 2013

(65) Prior Publication Data
US 2014/0327408 A1 Nov. 6, 2014

(30) Foreign Application Priority Data
Oct. 31, 2011 (JP) .................................. 2011-238992

(51) Int. Cl.
*H02J 7/00* (2006.01)
*B60L 11/18* (2006.01)
(Continued)

(52) U.S. Cl.
CPC ........... *B60L 11/1809* (2013.01); *B60L 3/0084* (2013.01); *B60L 3/04* (2013.01);
(Continued)

(58) Field of Classification Search
CPC ...... Y02E 60/12; H01M 10/44; H02J 7/0065; H02J 7/0063; H02J 2007/0067; Y02T 90/14; Y02T 10/70; Y02T 10/7005; Y02T 10/7011; Y02T 10/7016; Y02T 10/7022
See application file for complete search history.

(56) References Cited

U.S. PATENT DOCUMENTS 5,548,200 A * 8/1996 Nor ....................... B60L 11/184
320/106
6,131,680 A 10/2000 Nii et al.
(Continued)

FOREIGN PATENT DOCUMENTS

JP 09-308012 11/1997
JP 2007-330083 12/2007
(Continued)

OTHER PUBLICATIONS

International Standard, International Electrotechnical Commission, IEC 61851-1, Nov. 2010, pp. 1-48; Edition 2.0(2010).
(Continued)

*Primary Examiner* — Arun Williams
(74) *Attorney, Agent, or Firm* — Finnegan, Henderson, Farabow, Garrett & Dunner, LLP

(57) ABSTRACT

A vehicle 10 according to the embodiment of the present invention is applied to a charge-discharge system CDS. The charge-discharge system includes the vehicle 10, an electric power cable 20, a plug-in station 30, a HEMS 40, and a commercial power supply 50. From the HEMS 40 to the vehicle 10, a request for charge to charge an electric storage device 11 and a request for discharge to allow an external electric load to use an electric power of the electric storage device 11 are transmitted. When a request is changed from the request for charge to the request for discharge, or vice versa, the vehicle 10 realizes a charge-discharge stop state in which neither a charging operation nor a discharging operation is performed without directly changing from the charging operation to the discharging operation, or vice versa.

13 Claims, 12 Drawing Sheets

(51) Int. Cl.
*B60L 3/00* (2006.01)
*B60L 3/04* (2006.01)
*H02J 7/02* (2016.01)
*B60L 11/12* (2006.01)
*B60L 11/14* (2006.01)
*B60L 15/20* (2006.01)

(52) U.S. Cl.
CPC .............. *B60L 11/123* (2013.01); *B60L 11/14* (2013.01); *B60L 11/1803* (2013.01); *B60L 11/1812* (2013.01); *B60L 11/1816* (2013.01); *B60L 11/1818* (2013.01); *B60L 11/1824* (2013.01); *B60L 11/1842* (2013.01); *B60L 11/1844* (2013.01); *B60L 11/1846* (2013.01); *B60L 11/1861* (2013.01); *B60L 11/1868* (2013.01); *B60L 11/1877* (2013.01); *B60L 11/1887* (2013.01); *B60L 15/20* (2013.01); *H02J 7/02* (2013.01); *H02J 7/027* (2013.01); *B60L 2210/14* (2013.01); *B60L 2210/30* (2013.01); *B60L 2210/40* (2013.01); *B60L 2230/12* (2013.01); *B60L 2230/16* (2013.01); *B60L 2230/22* (2013.01); *B60L 2230/30* (2013.01); *B60L 2240/421* (2013.01); *B60L 2240/423* (2013.01); *B60L 2240/427* (2013.01); *B60L 2240/429* (2013.01); *B60L 2240/44* (2013.01); *B60L 2240/527* (2013.01); *B60L 2240/529* (2013.01); *B60L 2240/547* (2013.01); *B60L 2240/549* (2013.01); *B60L 2240/80* (2013.01); *Y02E 60/721* (2013.01); *Y02T 10/6217* (2013.01); *Y02T 10/645* (2013.01); *Y02T 10/7044* (2013.01); *Y02T 10/7066* (2013.01); *Y02T 10/7077* (2013.01); *Y02T 10/7088* (2013.01); *Y02T 10/7225* (2013.01); *Y02T 10/7241* (2013.01); *Y02T 10/7275* (2013.01); *Y02T 90/121* (2013.01); *Y02T 90/127* (2013.01); *Y02T 90/128* (2013.01); *Y02T 90/14* (2013.01); *Y02T 90/16* (2013.01); *Y02T 90/163* (2013.01); *Y02T 90/168* (2013.01); *Y02T 90/169* (2013.01); *Y02T 90/34* (2013.01); *Y04S 10/126* (2013.01); *Y04S 30/12* (2013.01); *Y04S 30/14* (2013.01)

(56) References Cited

U.S. PATENT DOCUMENTS

| | | | |
|---|---|---|---|
| 2008/0050645 A1* | 2/2008 | Kai | B60L 11/1861 429/61 |
| 2009/0030712 A1* | 1/2009 | Bogolea | B60L 11/1816 705/1.1 |
| 2010/0049533 A1* | 2/2010 | Ferro | G06Q 10/087 705/1.1 |
| 2010/0090524 A1 | 4/2010 | Obayashi | |
| 2010/0134067 A1 | 6/2010 | Baxter et al. | |
| 2010/0241297 A1 | 9/2010 | Aoki et al. | |
| 2011/0298417 A1* | 12/2011 | Stewart | G01R 31/025 320/107 |
| 2013/0029193 A1* | 1/2013 | Dyer | H01M 10/486 429/62 |
| 2013/0069425 A1* | 3/2013 | Kanazawa | B60L 11/1816 307/9.1 |
| 2013/0134940 A1* | 5/2013 | Tominaga | B60L 11/1846 320/109 |

FOREIGN PATENT DOCUMENTS

| | | |
|---|---|---|
| JP | 2009-126450 | 6/2009 |
| JP | 2009-303483 | 12/2009 |
| JP | 2011-109875 | 6/2011 |
| JP | 2012-16098 | 1/2012 |

OTHER PUBLICATIONS

Japan Electric Vehicle Association Standard, Electric Vehicle Conductive Charging Systems, General Requirements, Japan Electric Vehicle Association, Mar. 29, 2001, JEVS G109, pp. 1-34.

SAE Electric Vehicle and Plug in Hybrid electric Vehicle Conductive Charge Coupler, SAE International Surface Vehicle Recommended Practice, United States of America Standard SAEJ 1772, Jan. 22, 2010 pp. 1-51.

Written Opinion of the International Searching Authority in International Application No. PCT/JP2012/069933 (Mailing Date: Sep. 4, 2013).

* cited by examiner

VEHICLE WITH AN ELECTRIC STORAGE SECTION, AND CHARGE-DISCHARGE SYSTEM INCLUDING THE VEHICLE AND AN ENERGY MANAGEMENT EQUIPMENT

CROSS-REFERENCE TO RELATED APPLICATIONS

This application is a national phase application of International Application No. PCT/JP2012/069933, filed Jul. 31, 2012, and claims the priority of Japanese Application No. 2011-238992, filed Oct. 31, 2011, the content of both of which is incorporated herein by reference.

TECHNICAL FIELD

The present invention relates to a vehicle having an electric storage section, which can be charged with an electric power supplied from an external power supply (source) and can be discharged by supplying an electric power to an external electric load, and relates to a charge-discharge system including the vehicle and an energy management equipment.

BACKGROUND ART

Conventionally, there has been known a charge-discharge system, which can charge an electric storage device mounted on a vehicle with (by) an electric power supplied from a power source (supply) external to the vehicle, and which can supply an electric power from the electric storage device mounted on the vehicle to an electric load external to the vehicle (including an electric storage device external to the vehicle, and the like). Supplying the electric power from the electric storage device mounted on the vehicle to the electric load external to the vehicle means discharging in terms of the electric storage device mounted on the vehicle. Accordingly, in the present specification, supplying the electric power to the electric load external to the vehicle may be expressed as "discharging to the electric load external to the vehicle." Further, the electric storage device mounted on the vehicle may also be referred to as a "vehicle electric storage device", and the electric storage device external to (outside of) the vehicle may also be referred to as en "external electric storage device," Furthermore, the power source (supply) external to (outside of) the vehicle may also be simply referred to as an "external power source", and the electric load external to (outside of) the vehicle" may also be simply referred to as an "external electric load." The external electric storage device can be the external electric load as well as the external power source.

In the charge-discharge system described above, a control unit of the vehicle (control device mounted on the vehicle) controls the charge of the vehicle electric storage device using the electric power supplied from the external power source and the discharge of (from) the vehicle electric storage device to the external electric load.

Accordingly, the control unit of the vehicle needs to recognize/determines whether the charge of the vehicle electric storage device should be carried out using the electric power supplied from the external power source (that is, request for charge is being generated) or the discharge of (from) the vehicle electric storage device to the external electric load should be carried out (that is, request for discharge is being generated).

One of known arts is configured so as to supply the electric power from the external power supply to the vehicle electric storage device in response to a request from the vehicle, and so as to supply the electric power from the vehicle electric storage device to the external electric load in response to a request from an external equipment (e.g., device disposed inside of a house) (refer to Japanese Patent Application Laid-Open (kokai) No. 2009-303483).

SUMMARY OF THE INVENTION

Incidentally, for example, in a case in which the control unit of the vehicle is performing an operation (charging operation) to charge the vehicle electric storage device using the electric power supplied from the external power supply, and thus, the external power supply is supplying the electric power to the vehicle electric storage device, the control unit of the vehicle starts to supply the electric power from the vehicle electric storage device to the external electric load when the control unit of the vehicle falsely recognizes that the request for discharge has been generated for some reason. As a result, an electric power interference occurs.

A vehicle according to the present invention is made to cope with the problem described above.

More specifically, the vehicle according to the present invention comprises:

an electric storage section which can be charged using an electric power supplied from an external power supply and can be discharged by supplying the electric power to an external electric load; and a control unit which performs a charging operation to charge the electric storage section using the electric power supplied from the external power supply in response to (in accordance with) an obtained request for charge, and performs a discharging operation to supply the electric power from the electric storage section to the external electric load in response to (in accordance with) an obtained request for discharge.

Further, in the present invention, the control unit is configured so as to stop the charging operation to realize a charge-discharge stop state in which neither the charging operation nor the discharging operation is performed, when the control unit newly obtains the request for discharge while the charging operation is being performed.

According to this configuration, the electric power interference does not occur, because the electric power is not started to be supplied from the vehicle electric storage device while the external power supply is supplying the electric power to the vehicle electric storage device (i.e., during the charging operation).

One of aspects of the present invention, the control unit is configured, when the control unit newly obtains the request for discharge during the charging operation, so as to determine whether or not the control unit needs to continue the charging operation, so as to continue the charging operation when it determines that it needs to continue the charging operation, and so as to realize the charge-discharge stop state when it determines that it does not need to continue the charging operation.

For example, the configuration described above makes it possible to continue the charging operation by providing a priority to the request for charge which has previously arrived, or to start the discharging operation after reconfirming the request for discharge by providing a priority to the request for discharge which has newly arrived. Accordingly, it can be avoided to unnecessarily stop the charging operation, and an occurrence of the electric power interference can be avoided even when the control unit falsely recognizes that the request for discharge has newly been generated.

The vehicle configured as described above can exert a superior effect, for example, if an "energy management equipment (system)" external to the vehicle, such as the HEMS (Home Energy Management System) or the BEMS (Building Energy Management System), is configured so as to provide the request for charge and the request for discharge to the control unit of the vehicle, so as to connect the external power supply to the vehicle electric storage device when the equipment provides the request for charge to the control unit of the vehicle, and so as to connect the external electric load to the vehicle electric storage device when the equipment provides the request for discharge to the control unit of the vehicle.

That is, for example, the electric power interference occurs, when the control unit of the vehicle falsely recognizes that the request for discharge has been generated for some reason, and thus, starts the discharging operation to supply the electric power from the vehicle electric storage device to the external electric load, in a case in which the energy management equipment is actually providing the request for charge to the control unit of the vehicle, and therefore, the external power supply is being connected to the vehicle electric storage device.

In contrast, the vehicle configured as described above can continue the charging operation by regarding the request for discharge which is newly obtained as a request due to a false recognition, in a case in which the charging operation was started based on (in response to) the request from the energy management equipment (system). In other words, if the energy management equipment is made configured to provide the request for discharge to the control unit of the vehicle after providing a "request for stopping charging" to the control unit of the vehicle when it try to provide the request for discharge after providing the request for charge, the request for discharge can be treated as one due to the false recognition when the control unit of the vehicle newly obtains the request for discharge during the charging operation which the control unit started in response to the request for charge from the energy management equipment. Accordingly, it can be avoided to unnecessarily stop the charging operation which was started in response to the request for charge from the energy management equipment, and the occurrence of the electric power interference can be avoided even when the control unit falsely recognizes that the request for discharge has newly been generated.

Further. In another aspect of the vehicle according to the present invention, when the control unit obtains the request for charge or the request for discharge in the charge-discharge stop state, the control unit may be configured so as to start the charging operation or the discharging operation in response to the newly obtained request.

This makes it possible to confirm that the request for discharge is not a request due to the false recognition, and to start the discharging operation after the charging operation without the electric power interference.

Further, in one of aspects of the vehicle according to the present invention, the control unit of the vehicle may be configured so as to receive the request for charge and the request for discharge from the energy management equipment external to (outside of) the vehicle.

According to the configuration described above, in a case in which the energy management equipment is configured so as to provide "the request for charge or the request for discharge" to the control unit of the vehicle, so as to connect the external power supply to the vehicle electric storage device when it provides the request for charge to the control unit of the vehicle, and so as to connect the external electric load to the vehicle electric storage device when it provides the request for discharge to the control unit of the vehicle, the occurrence of the electric power interference can be avoided even when the control unit falsely recognizes that the request for discharge has newly been generated during the charging operation.

Further, the control unit may be configured so as to generate the request for charge based on a state of the electric storage section. This configuration can maintain the charging state of the electric storage section at a desirable condition while avoiding the occurrence of the electric power interference.

Further, the vehicle of the present invention can cope with a case in which the new request for charge is obtained during the discharging operation.

That is, the vehicle according to the present invention may comprise:

an electric storage section which can be charged using an electric power supplied from an external power supply and can be discharged by supplying the electric power to an external electric load; and a control unit which performs a charging operation to charge the electric storage section using the electric power supplied from the external power supply in response to (in accordance with) an obtained request for charge, and performs a discharging operation to supply the electric power from the electric storage section to the external electric load in response to (in accordance with) an obtained request for discharge;

wherein, the control unit is configured so as to stop the discharging operation to realize a charge-discharge stop state in which neither the charging operation nor the discharging operation is performed, when the control unit newly obtains the request for charge while the discharging operation is being performed.

When the control unit of the vehicle falsely recognizes that the request for charge has been generated for some reason, and thus, immediately starts the charging operation while the discharging operation is being performed, the external electric bad is made connected to the vehicle electric storage device. Accordingly, if the external electric bad is the external power supply, the external power supply is enforced to be discharged unexpectedly.

In contrast, the vehicle of the present invention configured as described above can avoid the occurrence of such a state.

In this case, the control unit may be configured, when the control unit newly obtains the request for charge during the discharging operation, so as to determine whether or not the control unit needs to continue the discharging operation, so as to continue the discharging operation when it determines that it needs to continue the discharging operation, and so as to realize the charge-discharge stop state when it determines that it does not need to continue the discharging operation.

For example, the configuration described above makes it possible to continue the discharging operation by providing a priority to the request for discharge which has previously arrived, or to start the charging operation by providing a priority to the request for discharge which has newly arrived, but after reconfirming the request for charge. Accordingly, when the external electric load is the external electric storage device, it can be avoided for the external electric storage device to be discharged unexpectedly.

In the aspect described above, when the control unit obtains the request for charge or the request for discharge in the charge-discharge stop state, the control unit may be configured so as to start the charging operation or the discharging operation in response to the newly obtained request.

This makes it possible to confirm that the request for charge is not a request due to the false recognition, and to start the charging operation after the discharging operation without the electric power interference. Further, this can prevent the external electric storage device from being unexpectedly discharged, in the case in which the external electric bad is the external electric storage device.

Further, in another of aspects of the vehicle according to the present invention, the control unit may be configured so as to receive the request for charge and the request for discharge from the energy management equipment external to (outside of) the vehicle.

According to the configuration described above, in a case in which the energy management equipment is configured so as to provide "the request for charge or the request for discharge" to the control unit of the vehicle, so as to connect the external power supply to the vehicle when it provides the request for charge to the control unit of the vehicle, and so as to connect the external electric load to the vehicle when it provides the request for discharge to the control unit of the vehicle, it can be avoided that the external electric bad stops its operation unexpectedly even when the control unit falsely recognizes that the request for charge has newly been generated during the discharging operation.

Further, the control unit may be configured so as to generate the request for charge based on the state of the electric storage section. This configuration can maintain the charging state of the electric storage section at a desirable condition.

In addition, the present invention can be applied to a charge-discharge system including the vehicle as described above and the energy management equipment (system).

That is, the charge-discharge system according to the present invention including a vehicle and an energy management equipment, wherein, the vehicle includes:

an electric storage section which can be charged using an electric power supplied from an external power supply and can be discharged by supplying the electric power to an external electric load; and a control unit which performs a charging operation to charge the electric storage section using the electric power supplied from the external power supply in response to (in accordance with) an obtained request for charge, and performs a discharging operation to supply the electric power from the electric storage section to the external electric load in response to (in accordance with) an obtained request for discharge; and the energy management equipment includes:

an electric power state change section which selectively realizes one of an electric power supplying state in which the electric power from the external power supply is capable of being supplied to the electric storage section of the vehicle and an electric power consuming state in which the electric power from the electric storage section of the vehicle is capable of being supplied to the external electric load; and a management section which provides the request for charge or the request for discharge to the control unit of the vehicle, makes the electric power state change section realize the electric power supplying state when it provides the request for charge to the control unit, and makes the electric power state change section realize the electric power consuming state when it provides the request for discharge to the control unit;

wherein, the control unit of the vehicle is configured so as to stop the charging operation to realize a charge-discharge stop state in which neither the charging operation nor the discharging operation is performed when the control unit newly obtains the request for discharge while the charging operation is being performed, and so as to stop the discharging operation to realize the charge-discharge stop state when the control unit newly obtains the request for charge while the discharging operation is being performed, and the management section of the energy management equipment is configured so as to provide a request to stop the charging operation to the control unit before providing the request for discharge in a case in which it provides the request for discharge to the control unit after providing the request for charge to the control unit, and so as to provide a request to stop the discharging operation to the control unit before providing the request for charge in a case in which it provides the request for charge to the control unit after providing the request for discharge to the control unit.

According to the system described above, the energy management equipment provides the request to stop the discharging operation or the charging operation to the control unit when it switches over form the request for charge to the request for discharge, or vice versa. Therefore, the occurrence of the electric power interference, etc. can be avoided when an operation is changed from the charging operation to the discharging operation, or vice versa (based on the proper request from the energy management equipment).

Further, it is preferable that the control unit of the vehicle (of the charge-discharge system) be configured, when the request for discharge is newly obtained during the charging operation, so as to continue the charging operation in a case in which the charging operation was started based on (in response to) the request for charge supplied from the management section, and so as to realize the charge-discharge stop state in a case in which the charging operation was started based on (in response to) the request for charge supplied from other than the management section.

As described above, the energy management equipment provides the request to stop the charging operation to the control unit of the vehicle when the energy management equipment switches over the request from the request for charge to the request for discharge. Accordingly, the control unit of the vehicle can determine that, when the request for discharge is newly obtained during the charging operation, the request for discharge is not the request from the energy management equipment. Further, if the charging operation which is being performed at the present point in time was caused by the request from the energy management equipment, it is fair/proper to determine that the energy management equipment maintains the "electric power supplying state in which the electric power from the external power supply is capable of being supplied to the electric storage section of the vehicle." In view of the above, the configuration described above can avoid the occurrence of the electric power interference without stopping unnecessarily the charging operation.

Further, it is preferable that the control unit of the vehicle (of the charge-discharge system) be configured, when the request for charge is newly obtained during the discharging operation, so as to continue the discharging operation in a case in which the discharging operation was started based on (in response to) the request for discharge supplied from the management section, and so as to realize the charge-discharge stop state in a case in which the discharging operation was started based on (in response to) the request for discharge supplied from other than the management section.

As described above, the energy management equipment provides the request to stop the discharging operation to the control unit of the vehicle when the energy management equipment switches over the request from the request for discharge to the request for charge. Accordingly, the control unit of the vehicle can determine that, when the request for charge is newly obtained during the discharging operation, the request for charge is not the request from the energy management equipment. Further, if the discharging operation which is being performed at the present point in time was caused by the request from the energy management equipment, it is fair/proper to determine that the energy management equipment maintains the "electric power consuming state in which the electric power from the electric storage section of the vehicle is capable of being supplied to the external electric load." In view of the above, the configuration described above can avoid stopping supplying the electric power to the external device.

BRIEF DESCRIPTION OF THE DRAWINGS

The above and other objects, aspects, features and advantages of the present invention will become more apparent from the following detailed description when taken in conjunction with the accompanying drawings, in which.

DESCRIPTION OF THE EMBODIMENT TO CARRY OUT THE INVENTION

An embodiment of a charge-discharge system in accordance with the present invention will now be described with reference to the drawings. The charge-discharge system includes at least a vehicle and an energy management equipment (system). The charge-discharge system is a system which can supply an electric power from a vehicle (on-board) electric storage section to an external electric load which may include external (off-board) electric storage device, and can charge the vehicle electric storage section using an electric power supplied from an external power supply (source) which may include an external electric storage device. It should be noted that the vehicle electric storage section may include a "vehicle electric storage device which is mounted on the vehicle and can be charged with (using) an electric power supplied from the external power supply (and a generator mounted on the vehicle)" and a "generator which is mounted on the vehicle and generates an electric power to charge the vehicle electric storage section", or may include the vehicle electric storage device only.

(Outline of Structure)

Figure 1:
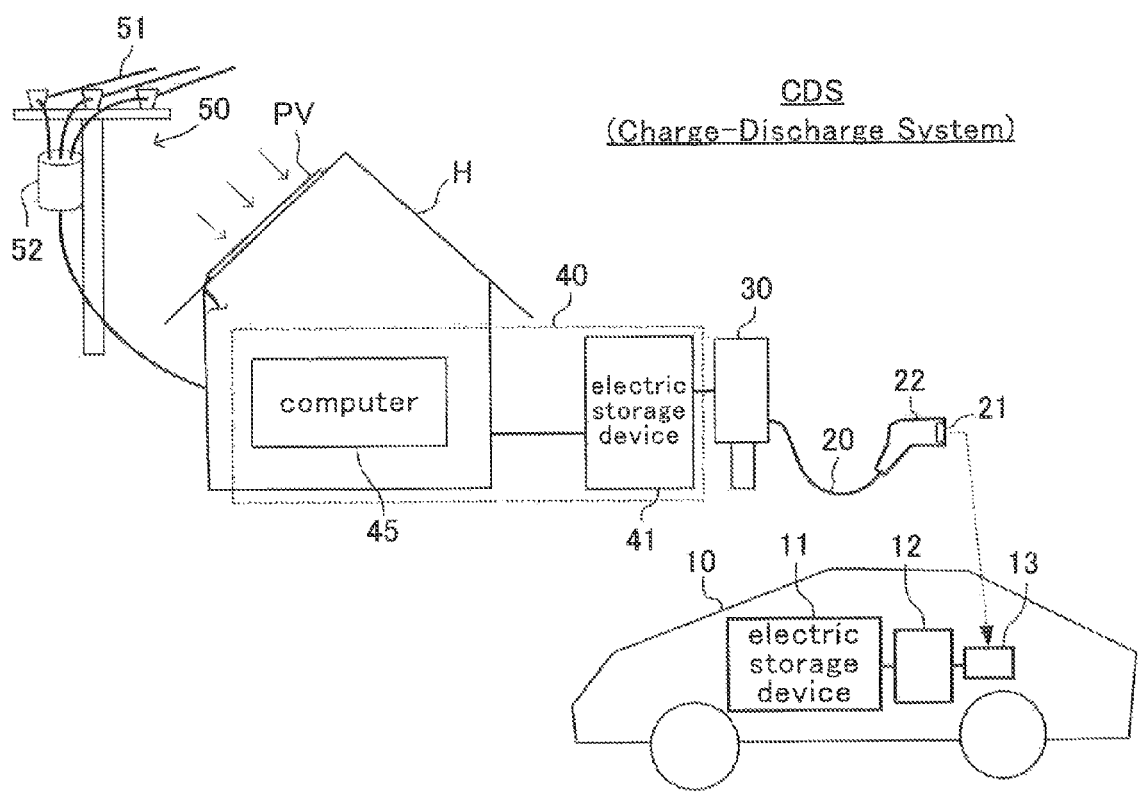
FIG. 1 is a schematic view of a charge-discharge system according to an embodiment of the present invention.

As shown in FIG. 1, the charge-discharge system CDS is configured to include a vehicle 10, a power cable 20, a plug-in station 30, a HEMS 40, and a commercial power supply 50.

The vehicle 10 includes an electric storage device 11, control unit (control device) 12, and an inlet 13.

The electric storage device 11 is an electric power storage component. The electric storage device 11 is therefore capable of being charged with (or using) an electric power supplied from an external power supply. The electric storage device 11 is capable of supplying an electric power to an external electric load. The electric storage device 11 is a lithium-ion battery, in the present example. The electric storage device 11 can be a secondary battery other than the lithium-ion battery, such as a nickel hydride battery and a lead battery, and also be a storage component which is chargeable-and-dischargeable. The electric storage device 11 may be referred to as a "vehicle (on-board) electric storage device 11" to be distinguished from an electric storage device external to (or outside of) the vehicle.

As described later in detail, the control unit 12 is an electric circuit, including a plurality of electronic control units (ECU) each of which includes a microcomputer; various sensors; a DC/AC converter; an AC/DC converter; relays; and so on. The control unit 12 controls a charge of the electric storage device 11 with (or using) the electric power supplied from the external power supply and a discharge of the electric storage device 11 by supplying the electric power to the external electric load (i.e., it controls discharge and charge of the electric storage device 11). The control of the charge-and-discharge means a control of an electric power or the like relating to the charge-and-discharge, such as start or stop of the charge, start or stop of the discharge, prohibition of the charge when a charge current is excessive, and prohibition of the discharge when a discharge current is excessive.

That is, the control unit 12 is able to:

perform a charging operation to charge the electric storage device 11 using the electric power supplied from the external power supply, in response to (in accordance with) a request for charge described later;

perform a discharging operation to supply the electric power to the external electric load from the electric storage device 11, in response to (in accordance with) a request for discharge described later; and realize a charge-discharge stop state in which neither charging the electric storage device 11 using the electric power supplied from the external power supply nor discharging the electric storage device 11 by supplying the electric power to the external electric load is performed. It should be noted that the control unit 12 may be referred to as a "vehicle (on-board) control unit 12" to be distinguished from a control device external to (or outside of) the vehicle.

The inlet 13 is configured so as to be capable of being connected with a connector 21 which is provided at one of ends of the power cable 20. The configurations including shapes and arrangements of end terminals of the inlet 13 and the connector 21 are compliant with (in conformity to), for example, (1) "SAE Electric Vehicle Conductive Charge Coupler" (United States of America), (SAE Standards. SAE international, November, 2001, United States of America Standard SAEJ1722);
(2) "General requirements of conductive charge system for an electric vehicle" (Japan electric vehicle standard), Mar. 29, 2001;
(3) International Standard IEC 61851:

and so on. It should be noted that those are the standards that can be applied when the charge of the electric storage device 11 using the external power supply is carried out. In contrast, the charge-discharge system according to the present embodiment performs not only charging but also discharging. Nevertheless, the configurations including shapes and arrangements of end terminals of the inlet 13 and the connector 21 are compliant with (in conformity to) those standards. Accordingly, the inlet 13 can be connected with an unillustrated power charge cable having a conventional connector (connector for charge) which is compliant with (in conformity to) those known standards.

It should be noted that, in the present example, the vehicle 10 is a hybrid vehicle comprising an internal combustion engine and a motor-generator as vehicle drive sources. However, as long as the vehicle 10 is a vehicle which can run using the electric power from the electric storage device 11 the structure is not limited. Accordingly, the vehicle 10 may be a vehicle mounting the electric storage device 11 and having an internal combustion engine only as the vehicle drive source, a fuel-cell vehicle, an electric vehicle, or the like.

The electric power cable (power cable) 20 comprises an operating portion 22 at one of the ends. The connector 21 is provided at a tip of the operating portion 22. The other one of the ends of the power cable 20 is connected with the plug-in station 30. The power cable 20 is used during both charging and discharging of the electric storage device 11.

The plug-in station 30 is located in the vicinity of a house H. As described later in detail, the plug-in station 30 includes a communication unit, a relay which selects either one of a power charge line (power line for charging) and a power discharge line (power line for discharging), a CPLT circuit (CPLT signal generation circuit), and so on. The plug-in station 30 is connected to the HEMS 40 through electric power lines including power charge lines and the power discharge ones, and the signal lines.

The HEMS 40 is a home energy management system. As described later in detail, the HEMS 40 in the present example includes an electric storage device external to (or outside of) the vehicle (hereinafter referred to as an "external electric storage device") 41, a computer 45, an AC/DC converter 42, a DC/AC inverter 43, a short-circuit protection circuit 44, and the like (refer to FIG. 5).

The external electric storage device 41 is configured so as to be capable of being charged and discharged. The external electric storage device 41 is a lead battery in the present example, however, the device 41 may be another type of secondary battery or the like as long as it is a rechargeable-and-dischargeable component. The external electric storage device 41 is connected with the plug-in station 30 through electric power lines. The external electric storage device 41 is configured so as to be charged using the electric power supplied from the vehicle electric storage device 11. Further, the external electric storage device 41 is also a power source for an electric power used in the house H as a home electric power.

The commercial power supply 50 includes a transformer 52 which converts a high voltage (e.g., 6600 V) electric power transmitted through electric power transmission lines 51 from a power plant and the like into a low voltage (e.g., 100 V or 200 V) electric power. The electric power supplied from the commercial power supply 50 is used as the home electric power in the home H, and is further supplied to the external electric storage device 41 through the HEMS 40 so as to charge the external electric storage device 41.

It should be noted that, in the present example, a photo voltaic system including solar battery panels PV is provided to the house H. An electric power generated by the photo voltaic system can be used as the home electric power, and can be used to charge the external electric storage device 41, similarly to the electric power from the commercial power supply 50.

In the thus configured charge-discharge system, the vehicle electric storage device 11 can be charged using the external power supply and can supply the electric power from the vehicle electric storage device 11 to the external electric load, in a state in which the connector 21 of the power cable 20 is connected with the inlet 13 of the vehicle. It should be noted that the external power supply includes the commercial power supply 50, the photo voltaic system, and the like. The external electric load includes the external electric storage device 41, the electric home appliances, and the like, used in the house H. Further, the external electric storage device 41 can also be configured so as to be used as the external power supply.

Details of the charge-discharge system will next be described. It should be noted that each component which is the same as the component which has already been described is given the same numeral as one given to such a component.

Figure 2:
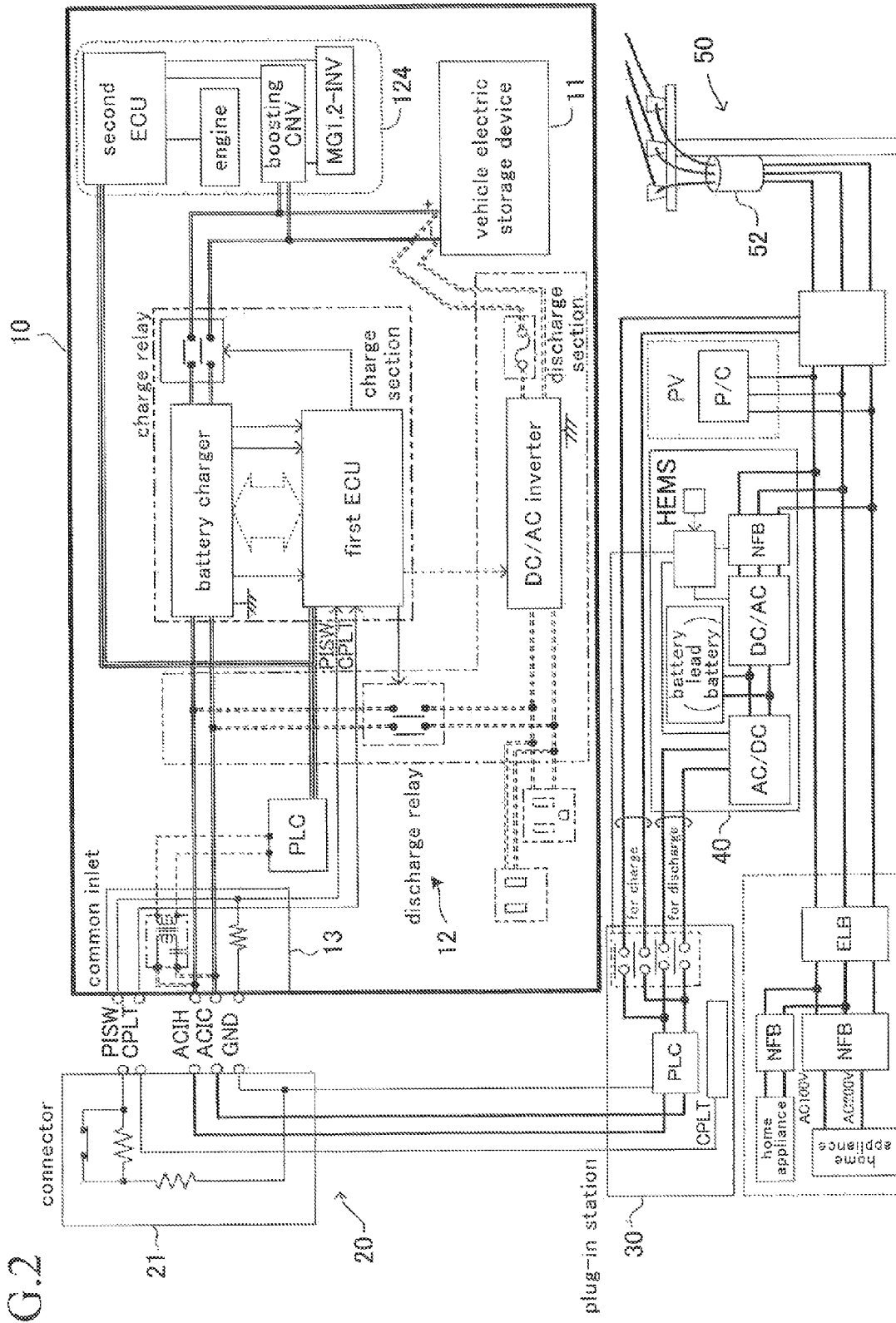
FIG. 2 is a schematic circuit diagram of the charge-discharge system shown in FIG. 1.
Figure 3:
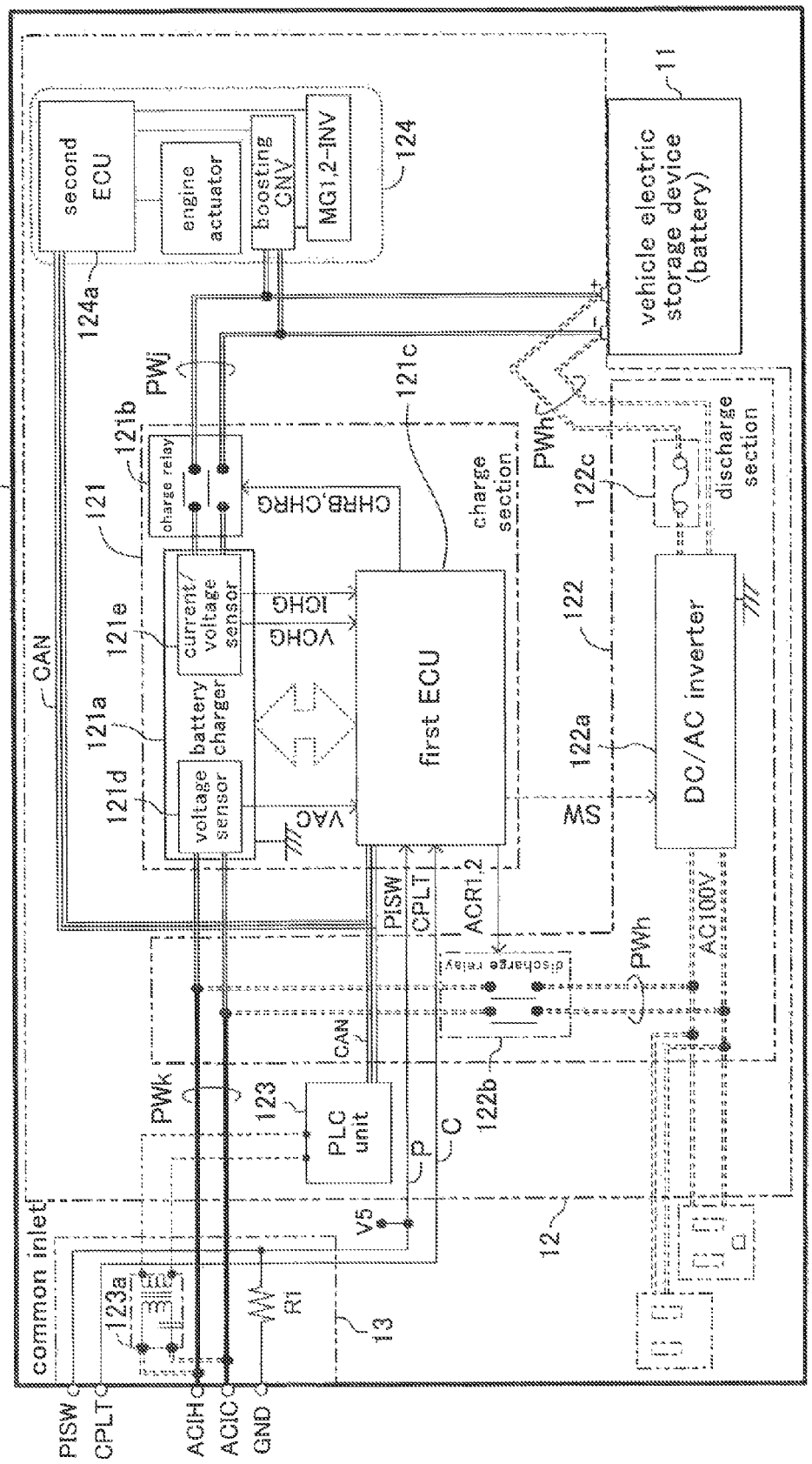
FIG. 3 is a schematic enlarged circuit diagram of the control device and the inlet, shown in FIG. 2, included in the vehicle.

As shown in FIG. 2 which shows an overall view and in FIG. 3 which shows an enlarged view, the vehicle 10 includes the vehicle electric storage device 11, the control unit 12, and the inlet 13, described above. Further, the vehicle 10 includes a pair of power lines (charge-and-discharge common power lines) PWk commonly used for charge-and-discharge shown by bold lines in FIG. 3, a pair of power lines (charge power lines) PWj used for charge shown by double solid lines in FIG. 3, and a pair of power lines (discharge power lines) PWh used for discharge shown by double broken lines in FIG. 3.

The control unit 12 includes a charge section 121, a discharge section 122, a PLC unit 123, and a vehicle control section 124.

The charge section 121 includes a battery charger 121a, a charge relay 121b, and a first electronic control unit 121c.

The battery charger 121a is connected with a pair of alternate current input-output terminals ACIH, ACIC of the inlet 13 through (via) the charge-and-discharge common power lines PWk and the charge power lines PWj. The battery charger 121a includes an unillustrated boosting transformer and an unillustrated AC/DC converter, and is configured so as to convert an AC power between the alternate current input-output terminals ACIH and ACIC into a DC power so that the battery charger 121a outputs the converted DC power to each of input terminals of the charge relay 121b.

The battery charger 121a includes a voltage sensor 121d and a current/voltage sensor 121e. The voltage sensor 121d measures a voltage VAC of the AC power which is input to the battery charger 121a, and outputs the voltage VAC to the first electronic control unit 121c. The current/voltage sensor 121e measures a current ICHG and a voltage VCHG of the DC power which is output between input terminals of the charge relay 121b, and output them to the first electronic control unit 121c. The battery charger 121a receives control signals from the first electronic control unit 121c, and converts, in response to (based on) the control signals, the AC power into the DC power which is to be supplied to the vehicle electric storage device 11.

The charge relay 121b is provided on (inserted into) the charge power lines PWj between the battery charger 121a and the vehicle electric storage device 11. The charge relay 121b opens its relay contacts in response to (based on) the control signal CHRB from the first electronic control unit 121c, and closes the relay contacts in response to (based on) the control signal CHRG from the first electronic control unit 121c. When the relay contacts of the charge relay 121b are opened, charging the vehicle electric storage device 11 (supplying the electric power to the vehicle electric storage device 11) is stopped. When the relay contacts of the charge relay 121b are closed, the vehicle electric storage device 11 is charged.

The first electronic control unit (first ECU) 121c is connected with a PISW terminal of the inlet 13 through (via) a connection line P. It should be noted that a constant voltage VS is applied to the connection line P. The connection line P is connected with a GND terminal connected to a ground point in the vehicle through (via) a resistor R1. The first electronic control unit 121c is connected with a CPLT terminal of the inlet 13 through (via) a connection line C. An unillustrated resistor is connected to the connection line C so as to lower (decrease) a voltage at the CPLT terminal from V1 to V2 when the connector 21 is made connected with the inlet 13. The first electronic control unit 121c is connected with the PLC unit 123 and a second electronic control device 124a through (via) a communication line of a CAN (control area network).

The first electronic control unit 121c is configured so as to send a control signal SW to a DC/AC inverter 122a of the discharge section 122 described later. Further, the first electronic control unit 121c is configured so as to send control signals ACR1, ACR2 to a discharge relay (relay for discharge) 122b of the discharge section 122 described later.

The discharge section 122 includes a DC/AC inverter 122a, the discharge relay 122b, and a fuse 122c.

The DC/AC inverter 122a is connected with a positive electrode and a negative electrode of the vehicle electric storage device 11 through (via) the discharge power lines PWh. The DC/AC inverter 122a is configured so as to convert a DC power between the positive electrode and the negative electrode of the vehicle electric storage device 11 into an AC power (e.g., AC 100 V or AC 200 V) so that the DC/AC inverter 122a outputs the converted AC power to each of input terminals of the discharge relay 122b. The fuse 122c is provided to (inserted in) the discharge power line PWh between the DC/AC inverter 122a and the positive electrode of the vehicle electric storage device 11.

The discharge relay 122b is provided on (inserted in) the discharge power lines PWh in series, the lines PWh connecting between the charge-and-discharge common power lines PWk and output terminals of the DC/AC inverter 122a. The discharge relay 122b opens its relay contacts in response to a control signal ACR1 from the first electronic control unit 121c, and closes the relay contacts in response to a control signal ACR2 from the first electronic control unit 121c. When the relay contacts of the discharge relay 122b are opened, discharging the vehicle electric storage device 11 (supplying the electric power to the external electric load) is stopped. When the relay contacts of the discharge relay 122b are closed, the discharge of (from) the vehicle electric storage device 11 is carried out.

The PLC unit 123 is a unit carrying out a power line communication. That is, the PLC unit 123 is a unit which exchanges information using communication signals transmitted through (via) the power lines. The PLC unit 123 is also referred to as a "second communication unit 123" or a "on-board communication unit 123", for convenience. The PLC unit 123 is connected with a pair of the alternate current input-output terminals ACIH and ACIC of the net 13 through (via) a transformer (voltage transformer) 123a. This allows the PCL unit 123 to receive the communication signals transmitted to a pair of the alternate current input-output terminals ACIH and ACIC. The PLC unit 123 is configured so as to send the received communication signals to the first electronic control unit 121c. Further, the PCL unit 123 is configured so as to send, in response to (based on) an instruction from the first electronic control unit 121c, communication signals which convey certain information to a pair of the alternate current input-output terminals ACIH and ACIC.

The vehicle control section 124 (second ECU) includes the second electronic control device 124a, engine actuators, a boosting converter, an inverter for a first motor generator, and an inverter for a second motor generator. The second electronic control unit 124a can vary an output power of an unillustrated internal combustion engine by controlling the engine actuators, such as fuel injectors, and an throttle valve actuator. The second electronic control device 124a can control an output torque and a rotational speed of each of the first motor generator and the second motor generator, by controlling the boosting converter, the inverter for the first motor generator, and the inverter for the second motor generator. Accordingly, the second electronic control device 124a can generate a driving force for the vehicle 10 from the internal combustion engine and the second motor generator while operating the internal combustion engine at a maximum efficiency. Further, the second electronic control device 124a can charge the vehicle electric storage device 11 by driving the first motor generator and the like using the engine. Details of those controls are described in, for example, Japanese Patent Application Laid-Open (kokai) Nos. 2009-126450 (United State Patent publication US2010/0241297), and Japanese Patent Application Laid-Open (kokai) No. H9-308012 (U.S. Pat. No. 6,131,680, filed on Mar. 10, 1997). Those are incorporated by reference in the present specification. In addition, the second electronic control device 124a can generate an electric power using the first motor generator and so on in response to (based on) the signal (request signal for power generation) obtained through the CAN from the first electronic control unit 121c, and can supply the generated electric power to the external electric load through (via) the discharge section 122, the inlet 13, and so on, even while the vehicle 10 is stopped.

The inlet 13 is provided at a side panel or the like of the vehicle 10. As described above, the inlet 13 has the shape that allows the connector 21 of the power cable 20 to be connected with the inlet 13. The inlet 13 includes the PISW terminal (receiving side PISW terminal, inlet side PISW terminal), the CPLT terminal (receiving side CPLT terminal, inlet side CPLT terminal), the ACIH terminal (inlet side ACIH terminal), the ACIC terminal (inlet side ACIC terminal), and the GND terminal (inlet side GND terminal).

Figure 4:
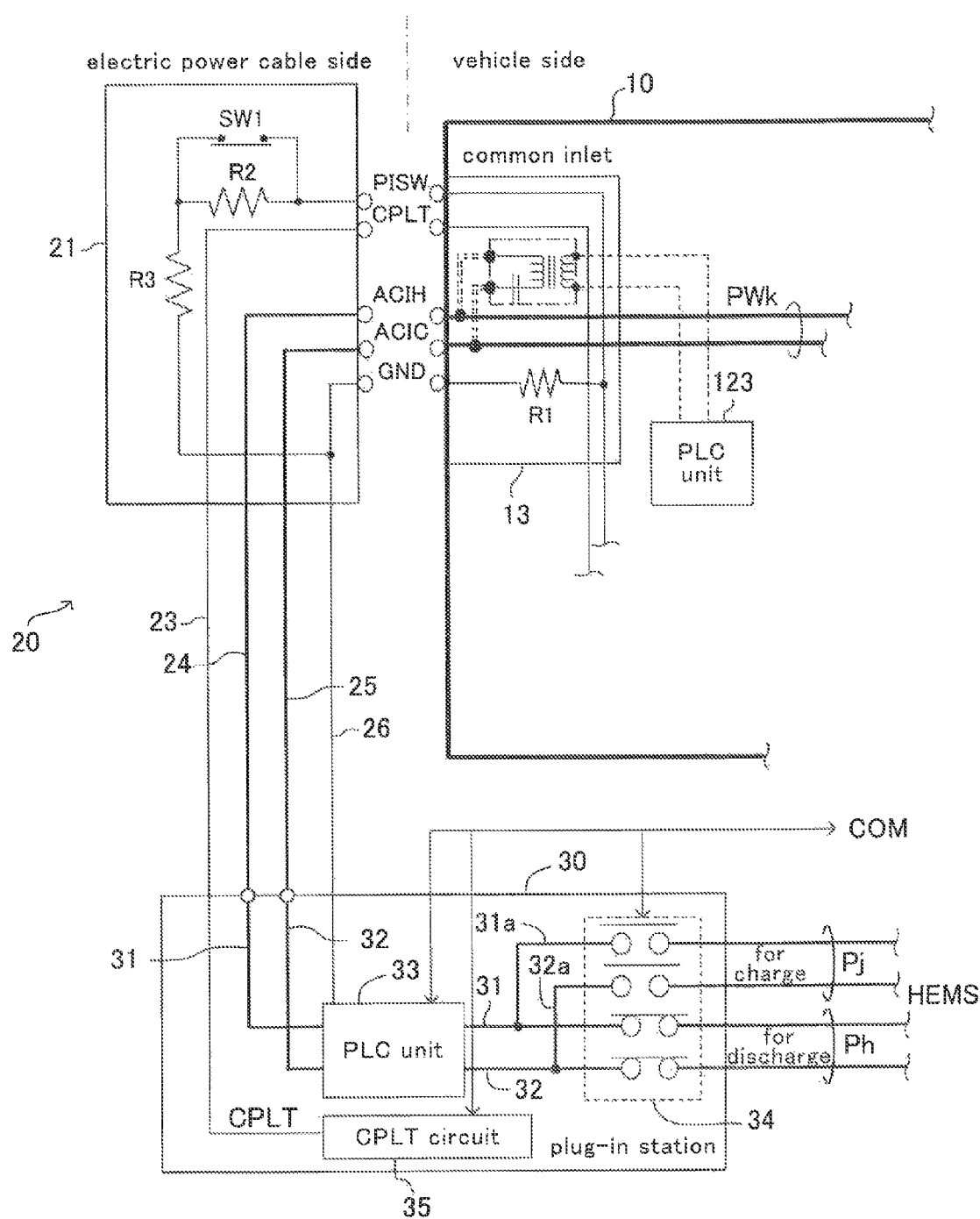
FIG. 4 is a schematic enlarged circuit diagram of the power cable and the plug-in station, shown in FIG. 2.

As shown in FIG. 2 which shows the overall view and in FIG. 4 which shows an enlarged view, the power cable 20 includes the connector 21, a control pilot line (CPLT signal line) 23, a pair of power lines 24, 25, and a grounding line (wire) 26.

The connector 21 is connected with each one of ends of the control pilot line (CPLT signal line) 23, a pair of the power lines 24, 25, and the grounding line 26 (i.e., one of the ends of the power cable). The connector 21 includes the PISW terminal (sending side PISW terminal, cable side PISW terminal), the CPLT terminal (sending side CPLT terminal, cable side CPLT terminal, specific terminal), the ACIH terminal (cable side ACIH terminal), the ACIC terminal (cable side ACIC terminal), and the GND terminal (cable side GND terminal).

When the connector 21 is physically connected with the inlet 13, the sending side PISW terminal of the connector 21 is physically and electrically connected with the receiving side PISW terminal of the inlet 13, the sending side CPLT terminal of the connector 21 is physically and electrically connected with the receiving side CPLT terminal of the inlet 13, the cable side ACIH terminal of the connector 21 is physically and electrically connected with the inlet side ACIH terminal of the inlet 13, the cable side ACIC terminal of the connector 21 is physically and electrically connected with the inlet side ACIH terminal of the inlet 13 and the cable side GND terminal of the connector 21 is physically and electrically connected with the inlet side GND terminal of the inlet 13.

A resistance circuit formed of a resistor R2 and a resistor R3 connected with each other in series is connected between the sending side PISW terminal of the connector 21 and the sending side (cable side) GND terminal of the connector 21.

The connector 21 further includes a switch SW1. The switch SW1 is configured so as to open and close in accordance with a fitting state between the connector 21 and the inlet 13, when convex portions of a locking mechanism of the connector 21 fits with corresponding concave portions of the inlet 13. Specifically, the switch SW1 is configured so as to be closed, when the connector 21 and the inlet 13 have not been fitted with each other (i.e., in the non-fitting state). The switch SW1 is configured so as to be opened, when the connector 21 and the inlet 13 are incompletely fitted with each other so that each of the terminals of the connector 21 and the each of the terminals of the inlet 13 are electrically connected with each other, but the connector 21 and the inlet 13 are not completely fitted with each other (i.e., in the incomplete fitting state). Further, the switch SW1 is configured so as to be closed again, when the connector 21 and the inlet 13 are completely fitted with each other so that each of the terminals of the connector 21 and the each of the terminals of the inlet 13 are electrically connected with each other (i.e., in the complete fitting state).

The control pilot line 23 is connected to the CPLT terminal (sending side CPLT terminal).

The power line 24 is connected to the ACIH terminal (cable side ACIH terminal).

The power line 25 is connected to the ACIC terminal (cable side ACIC terminal).

The grounding wire 26 is connected to the GND terminal (cable side GND terminal).

The plug-in station 30 includes power lines 31, 32, a PLC unit 33, diverged power lines 31a, 32a, a charge-discharge switching relay 34, and a CPLT circuit 35.

The power line 31 is connected with the power line 24 of the power cable 20 and with one of a pair of discharge relays of the charge-discharge switching relay 34.

The power line 32 is connected with the power line 25 of the power cable 20 and with the other one of a pair of the discharge relays of the charge-discharge switching relay 34.

The PLC unit 33 is a unit carrying out the power line communication, similarly to the PCL unit 123. The PLC unit 33 is provided on (inserted into) the power line 31 and the power line 32 (so as to be capable of providing communication signals to the power line 31 and the power line 32). The PLC unit 33 is configured so as to be able to communicate with a computer 45 of the HEMS 40 described later (refer to FIG. 5). The PLC unit 33 can send, in response to an instruction from the computer 45 of the HEMS 40, communication signals which convey certain information to the ACIH terminal (cable side AICH terminal) and the ACID terminal (cable side ACIC terminal) of the connector 21 through (via) the power lines 31, 24 and the power lines 32, 25. Further, as described above, the PLC unit 123 of the vehicle 10 can send the communication signals which convey certain information to a pair of the alternate current input-output terminals ACIH and ACIC. Accordingly, the PCL unit 33 and the PLC unit 123 can exchange information using the communication signals according to a predetermined protocol. It should be noted that the PLC unit 33 may also be referred to as a "first communication unit 33" or an "external vehicle (off-board) communication unit 33."

The power line 31 diverges at a position between the PLC unit 33 and the charge-discharge switching relay 34. The diverged power line 31a from the power line 31 is connected to one of a pair of charge relays of the charge-discharge switching relay 34.

The power line 32 diverges at a position between the PLC unit 33 and the charge-discharge switching relay 34. The diverged power line 32a from the power line 32 is connected to the other one of a pair of the charge relays of the charge-discharge switching relay 34.

A pair of the discharge relays of the charge-discharge switching relay 34 are connected with a pair of discharge power lines Ph (power lines Ph used for discharge) connected to the HEMS 40, as described later.

A pair of the charge relays of the charge-discharge switching relay 34 are connected with a pair of charge power lines Pj (power lines Pj used for charge) connected to the HEMS 40, as described later.

The charge-discharge switching relay 34 works (operates) in response to a switching signal sent form the computer 45 of the HEMS 40. When a pair of the discharge relays of the charge-discharge switching relay 34 close their contacts, a pair of the charge relays of the charge-discharge switching relay 34 open their contacts. In contrast, when a pair of the discharge relays of the charge-discharge switching relay 34 open their contacts, a pair of the charge relays of the charge-discharge switching relay 34 close their contacts. Further, the charge-discharge switching relay 34 is maintained at a state where all of its contacts are opened, when neither the charge nor the discharge is carried out.

The CPLT circuit 35 is configured so as to provide (send) a control pilot signal having a constant voltage or a duty cycle (duty ratio) described later to the CPLT terminal (sending side CPLT terminal) of the connector 21 through (via) the control pilot line 23. It should be noted that the voltage generated by the CPLT circuit 35 is equal to V1 (e.g. 12 V). Accordingly, a voltage of a pulse of the duty signal generated by the CPLT circuit 35 is also equal to V1. The CPLT circuit 35 is configured so as to be capable of communicating with the computer 45 of the HEMS 40, so that it can send (provide) a permissible current value (value of an allowable current, current rating, rated ampacity) to the computer 45 of the HEMS 40.

Figure 5:
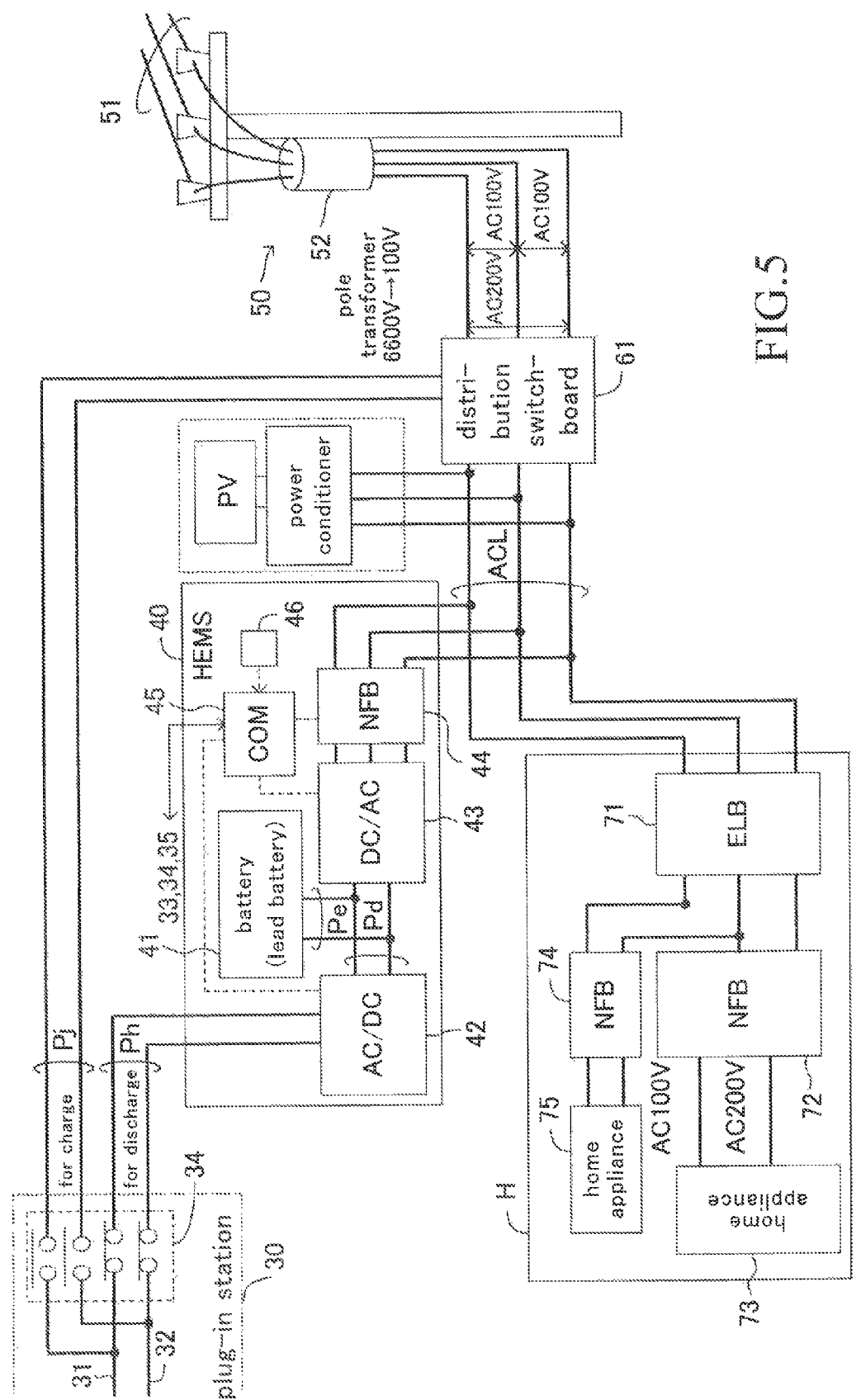
FIG. 5 is a schematic enlarged circuit diagram of the HEMS and the external power supply, shown in FIG. 2.

As shown in FIG. 2 which shows the overall view and in FIG. 5 which shows an enlarged view, the HEMS 40 includes the external electric storage device 41, the AC/DC converter 42, the DC/AC inverter 43, the short-circuit protection circuit (NFB) 44, the computer 45, and the input device 46.

As described above, the external electric storage device 41 is the secondary battery (lead battery, in the present example) which can be charged using the electric power supplied from the commercial power supply 50 and the electric power supplied from the vehicle electric storage device 11.

The AC/DC converter 42 is connected with a pair of the discharge power lines Ph connected to the charge-discharge switching relay 34 of the plug-in station 30.

The DC/AC inverter 43 is connected with the AC/DC converter 42 through (via) power lines Pd.

The short-circuit protection circuit (NFB) 44 is inserted between the DC/AC inverter 43 and power lines ACL which transmit an AC power supplied from the external power supply 50 through (via) a distribution switchboard 61.

The computer 45 is connected with the AC/DC converter 42, the DC/AC inverter 43, and the short-circuit protection circuit (NFB) 44, and sends the instruction signals to them or monitors theft operation states.

The computer 45 is further configured so as to store information which is input by the user through the input device 46.

The house H is configured so as to supply the electric power (AC 200V) on the power lines ACL to the electric home appliance 73 through, for example, an earth leakage breaker (ELM 71 and a short-circuit protection circuit (NFB) 72, and so as to supply the electric power (AC 100V) on the power lines ACL to the electric home appliance 75 through the earth leakage breaker 71 and a short-circuit protection circuit 74.

The distribution switchboard 61 is configured so as to output the low voltage electric power supplied from the commercial power supply 50 through the transformer 52 onto the power lines ACL. Further, the distribution switchboard 61 is configured so as to output the low voltage electric power supplied from the commercial power supply 50 through the transformer 52 onto the charge power lines Pj connected to the charge-discharge switching relay 34.

Operations (charging sequence and discharging sequence) of the thus configured charge-discharge system CDS will next be described. It should be noted that operations performed by the HEMS 40 are realized by executing processes by the computer 45, and operations performed by the vehicle 10 are realized by executing processes by the CPU of the first electronic control unit 121c.

<Discharging Sequence Using Communication>

The discharging sequence using the HEMS 40 will next be described with reference to FIGS. 6 to 8. The HEMS 40 discharges the electric storage device 11 using the communication (communication signals) between the PLC unit 33 which is the communication unit and the PLC unit 123 which is the communication unit of the vehicle 10. This type of discharge is also referred to as a "discharge (discharging) using communication", hereinafter.

Firstly, the user connects the connector 21 of the power cable 20 to the inlet 13 of the vehicle 10. As described above, the switch SW1 is closed when the connector 21 and the inlet 13 have not been fitted with each other (i.e., in the non-fitting state), is opened when the connector 21 and the inlet 13 are incompletely fitted with each other (i.e., in the incomplete fitting state), and is closed again when the connector 21 and the inlet 13 are completely fitted with each other (i.e., in the complete fitting state).

When the resistance values of the resistor R1, R2, and R3 are R1, R2, and R3 ($\Omega$), respectively, the resistance value between the PISW terminal and the GND terminal is equal to Rn=R1 ($\Omega$) in the non-fitting state, is equal to Rh=R1·(R2+R3)/(R1+R2+R3) ($\Omega$) in the incomplete fitting state, and is equal to Rf=R1·R3/(R1+R3) ($\Omega$) in the complete fitting state. Accordingly, if the R1, R2, and R3 are appropriately set, the resistance value between the PISW terminal and the GND terminal lowers in a stepwise fashion from Rn to Rh, and then to Rf, as the fitting state between the connector 21 and the inlet 13 proceeds from the non fitting state to the incomplete fitting state, and then to the complete fitting state. Therefore, the resistance value between the PISW terminal and the GND terminal becomes the lowest (minimum) value Rf when the connector 21 and the inlet 13 are completely connected with each other.

Meanwhile, when the connector 21 and the inlet 13 are not connected with each other, the CPLT circuit 35 generates the constant voltage (non-oscillation) V1 (e.g., V1=12 V). That is, the control pilot signal (CPLT signal) is equal to V1 which is constant. When the connector 21 and the inlet 13 are completely connected with each other, the voltage (potential) at the receiving side CPLT terminal lowers/decreases to V2 (e.g., 9 V) smaller than V1 owing to an unillustrated resistor provided in the inlet 13 (refer to step S1 in FIG. 6).

It should be noted that the first electronic control unit 121c which is in the sleep state may lowers the voltage of the CPLT signal from V1 down to V2. In addition, the control device 12 may include a circuit, which is provided separately from the first electronic control unit 121c and is always supplied with the electric power from the vehicle electric storage device 11, and the circuit may detect a change in the resistance value between the PISW terminal and the GND terminal and may lowers/decreases the voltage of the control pilot signal (CPLT signal) from V1 down to V2.

Figure 6:
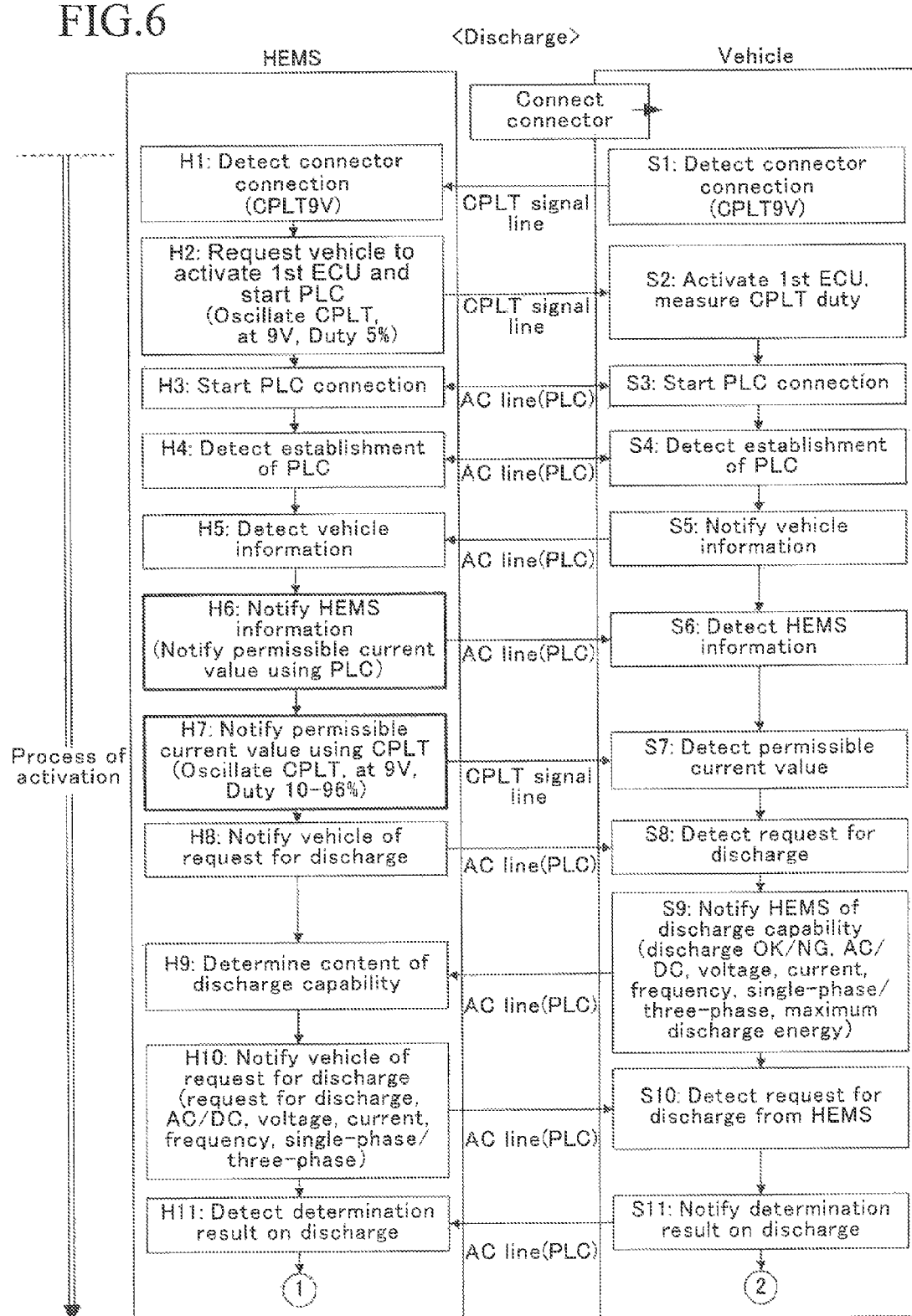
FIG. 6 is a process chart during discharging operation of the charge-discharge system shown in FIG. 2.

After the HEMS 40 confirms that the potential (voltage) of the CPLT signal line 23 becomes V2 at step H1 of FIG. 6, the HEMS 40 oscillates the CPLT signal to have a duty cycle 5% at step H2. Having the duty cycle of the CPLT signal be equal to 5% means sending to the vehicle 10 a "request for starting the PLC communication and a vehicle activating request (first electronic control unit activating request)." It should be noted that the standard defines that, when the duty cycle of the CPLT signal is within 10% to 96%, the duty cycle indicates that there is/arises a "usual request for charge without using the communication, which is different from the charge-discharge owing to the communication of the HEMS 40, and so on." Further, the standard defines that, when the duty cycle of the CPLT signal is within 10% to 96%, the duty cycle indicates a "permissible current value (current rating) of a power charge cable connected with the inlet 13." That is, according to the standards, in the case in which the duty cycle of the CPLT signal is within 10% to 96%, the duty cycle has a predetermined relation with the permissible current value of the power charge cable.

The vehicle 10 activates the first electronic control unit 121c at step S2 to measure the duty cycle of the CPLT signal. The process at this point in time corresponds to step 200 shown in FIG. 7. FIG. 7 is a flowchart showing operating procedure executed by the vehicle 10 (CPU of the first electronic control unit 12). After the vehicle 10 measures the duty cycle, the vehicle 10 proceeds to step 205 shown in FIG. 7, at which the vehicle 10 determines whether or not the measured duty cycle of the CPLT signal is 5%. At the present point in time, the CPLT signal having the 5% duty cycle is being sent from the HEMS 40. Accordingly, the vehicle 10 make a "Yes" determination at step 205 to proceed to step 210, at which the vehicle 10 establishes a PLC connection (makes a preparation to enable the communication using the power line communication) (refer to step S3 in FIG. 6). That is, the vehicle 10 establishes a communication enabled state between the PLC unit (second communication unit) 123 of the vehicle 10 and the PLC unit (first communication unit) 33 of the plug-in station 30.

Figure 7:
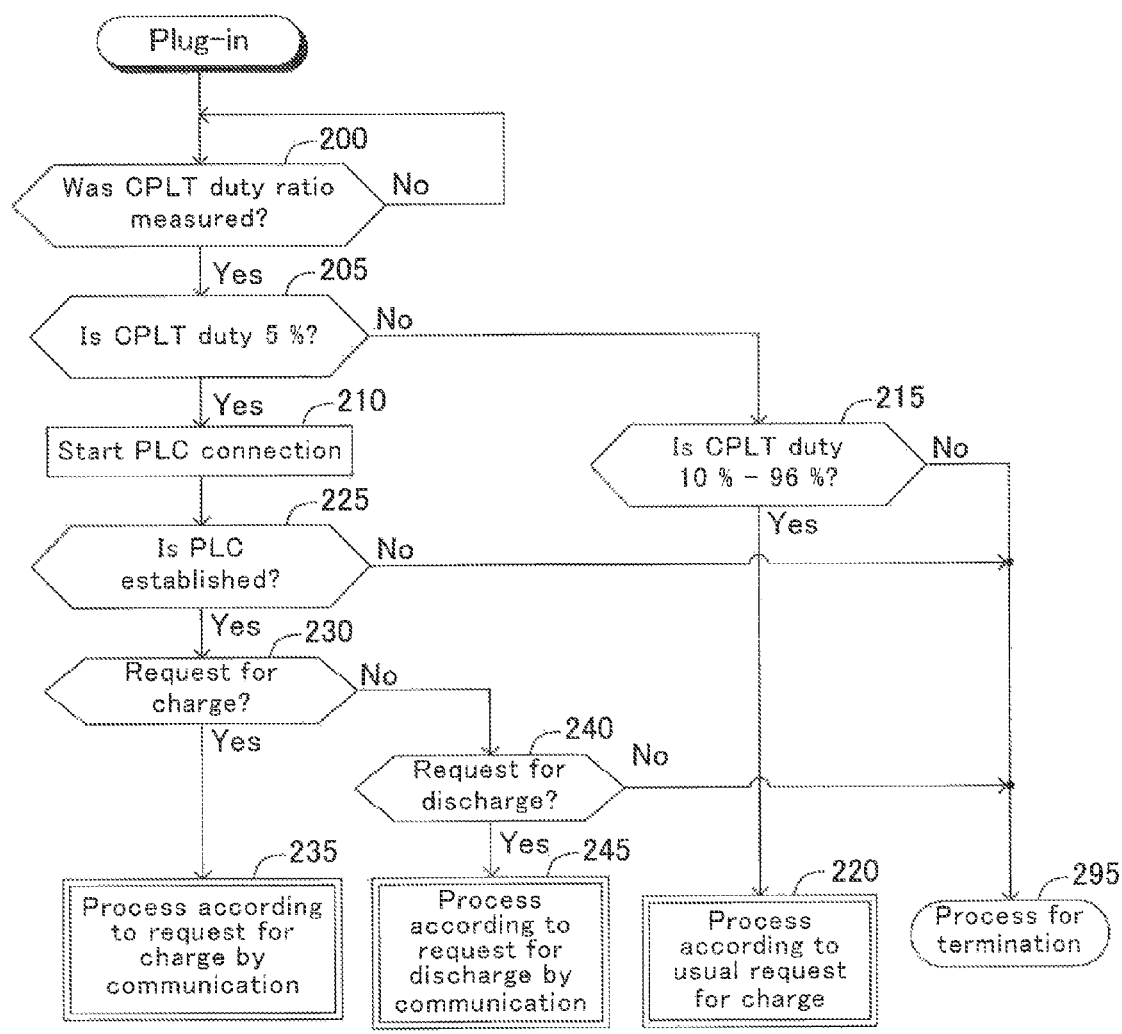
FIG. 7 is a flowchart showing a routine executed by the CPU of the first electronic control unit shown in FIG. 2.

It should be noted that, if the duty cycle of the CPLT signal is not 5% when the vehicle 10 executes the process of step 205 shown in FIG. 7, the vehicle makes a "No" determination at step 205 to proceed to step 215, at which it determines whether or not the duty cycle of the CPLT signal is within 10 to 96%. That is, the vehicle 10 determines whether or not the request for charge according to the standard (i.e., request for charge without using the communication) has been generated.

At this point in time, if the duty cycle of the CPLT signal is within 10% to 96%, the vehicle 10 makes a "Yes" determination at step 215 to proceed to step 220, at which it starts a charge process based on the usual request for charge. In this case, the vehicle 10 obtains, based on the duty cycle of the CPLT signal, the permissible current value of the power charge cable connected with the inlet 13 (in conformity to the known standard), and uses the "obtained permissible current value of the power charge cable" for a control for charging based on the usual request for charge at step 220.

Further, if the duty cycle of the CPLT signal is not within 10 to 96% when the vehicle 10 executes the process of step 215 shown in FIG. 7, the vehicle 10 proceeds to step 295 to end the process.

When the vehicle 10 proceeds to step 210 shown in FIG. 7, in other words, when the vehicle 10 proceeds to step S3 shown in FIG. 6, the HEMS 40 also starts to establish the PLC connection, as shown in step H3 in FIG. 6. Thereafter, the HEMS 40 detects an establishment of the PLC communication at step H4. Similarly, the vehicle 10 detects the establishment of the PLC communication at step S4 shown in FIG. 6. This process corresponds to a "Yes" determination at step 225 shown in FIG. 7.

For example, if the vehicle 10 can not confirm the establishment of the PLC communication within a certain time, the vehicle 10 makes a No determination at step 225 shown in FIG. 7 to proceed step 295, at which it ends the present process tentatively. In this case, the oscillation of the CPLT signal is stopped.

In a case in which both the vehicle 10 and the HEMS 40 have detected the establishment of the PLC communication, the vehicle 10 notifies the HEMS 40 of vehicle information through the PLC communication at step S5 shown in FIG. 6. For example, the vehicle 10 sends to the HEMS 40, a remaining capacity (or State of Charge, SOC) of the vehicle electric storage device 11, a vehicle identification number to identify the vehicle 10, and so on, as the vehicle information.

The HEMS 40 detects (obtains) the vehicle information sent from the vehicle 10 through the PLC communication at step H5.

Subsequently, the HEMS 40 notifies the vehicle 10 of HEMS information using the PLC communication at step H6. For example, the HEMS 40 notifies the vehicle 10 of the permissible current value (current rating) of the power cable 20 which the HEMS 40 has recognized (obtained) from the CPLT circuit of the plug-in station 30 and a rated voltage (voltage rating) of the HEMS 40. The vehicle 10 detects (obtains) the HEMS information sent through the PLC communication from the HEMS 40 at step S6.

Subsequently, the HEMS 40 notifies the vehicle 10 of the permissible current value (current rating) of the electric power cable 20 using the CPLT signal, at step H7. More specifically, the HEMS 40 oscillates the CPLT signal in such a manner that the duty cycle of the CPLT signal is within 10% to 96% and corresponds to the permissible current value (current rating) of the electric power cable 20, using the CPLT circuit 35. The CPLT signal at this point in time is a "specific signal", which is provided to the vehicle 10 (in actuality, to the CPLT terminal of the inlet 13) from the electric power cable 20, and which is to notify the vehicle 10 of the permissible current value of the electric power cable 20.

Further, the "relation between the duty cycle and the permissible current value" in this case is the same as the "relation between the duty cycle and the permissible current value", which the CPLT circuit 35 uses/employs during the "charge based on the usual request for charge" which does not depend on the communication. In other words, the known "standard used (to be applied) when the permissible current value of the power charge cable is transmitted to the vehicle 10 using the CPLT signal upon the usual request for charge without using the communication" is also used/applied when the discharge based on the request for discharge using the communication is carried out. It should be noted that the voltage of the CPLT signal at this point in time (pulse voltage of the duty signal) is equal to V2 (=9 V).

At step S7, the vehicle 10 obtains/detects the permissible current value of the electric power cable 20 by converting the duty cycle of the CPLT signal transmitted/sent through (via) the CPLT signal line 23 into the "permissible current value of the electric power cable 20" in conformity to (or according to) the standard described above. The vehicle 10 uses the "permissible current value of the electric power cable 20 based on the duty cycle of the CPLT signal" obtained at step S7 or the "permissible current value of the electric power cable 20 included in the HEMS information transmitted from the HEMS 40 through the PLC communication" obtained at step S6, whichever is smaller, if they are different from each other, for a control of discharging. It should be noted that the vehicle 10 may preferentially use the "permissible current value of the electric power cable 20 obtained based on the duty cycle of the CPLT signal" for the control of discharging thereafter, if the "permissible current value of the electric power cable 20 based on the duty cycle of the CPLT signal" obtained at step S7 is different from the "permissible current value of the electric power cable 20 included in the HEMS information transmitted from the HEMS 40 through the PLC communication" obtained at step S6.

Subsequently, at step H8, the HEMS 40 notifies the vehicle 10 of the request for discharge through (using) the PLC communication. At step S8, the vehicle 10 detects the request for discharge transmitted through (using) the PLC communication. It should be noted that this process corresponds to a "No" determination at "step 230 shown in FIG. 7 at which the vehicle 10 determines whether or not the request for charge has been generated", and a "Yes" determination at "step 240 shown in FIG. 7 at which the vehicle 10 determines whether or not the request for discharge has been generated." Thereafter, the vehicle 10 proceeds to step 245 shown in FIG. 7 to execute the processes according to the request for discharge using (by) the communication.

That is, at step S9 shown in FIG. 6, the vehicle 10 notifies the HEMS 40 of discharge capability through (using) the PLC communication. More specifically, the vehicle 10 sends to the HEMS 40, as the discharge capability, information including: whether or not the discharge can be carried out at the present point in time; whether the electric power which will be discharged is a DC power or an AC power; the voltage, the current, and the frequency of the electric power which will be discharged; whether the electric power which will be discharged is a single-phase AC or a three-phase AC; a maximum energy which the vehicle can discharge; and so on.

Subsequently, at step H9, the HEMS 40 determines details of the request for discharge, based on the information on the discharge capability transmitted through the communication from the vehicle 10. Thereafter, at step H10, the HEMS 40 notifies the vehicle 10 of the details of the request for discharge through the PLC communication. The details of the request for discharge includes: for example, whether the electric power which the HEMS 40 requires is a DC power or an AC power; the voltage, the current, and the frequency of the electric power which the HEMS 40 requires: whether the electric power which the HEMS 40 requires is a single-phase AC or a three-phase AC; and so on.

At step S10, the vehicle 10 detects/obtains the request for discharge sent through (using) the PLC communication from the HEMS 40. At step S11, the vehicle 10 determines whether or not the request for discharge (details of the request for discharge) can be satisfied, and notifies the HEMS 40 of a result of the determination through (using) the PLC communication.

At step H11, the HEMS 40 detects/obtains the result of the determination sent from the vehicle 10.

Figure 8:
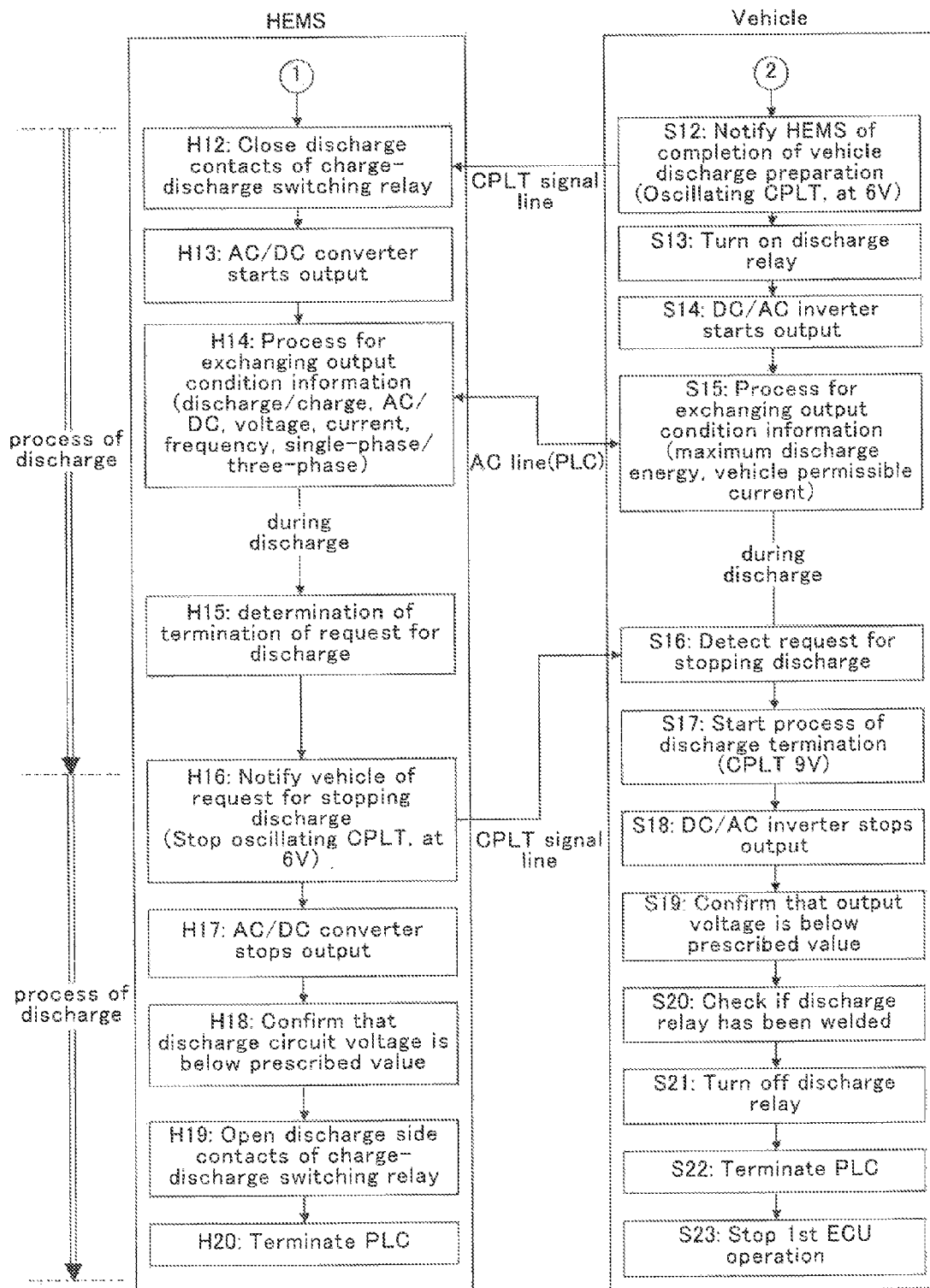
FIG. 8 is a process chart during discharging operation of the charge-discharge system shown in FIG. 2.

When the result of the determination indicates that the request for discharge from the HEMS 40 can be satisfied, the vehicle 10 notifies, using the CPLT signal line 23, the HEMS 40 of information indicating that the vehicle 10 has completed a preparation for discharge, at step S12 shown in FIG. 8. In actuality, the first electronic control unit 121c turns on an unillustrated switching element to lower the voltage (potential) at the CPLT terminal (i.e., the potential of the connection line C) from V2 to V3 (e.g., 6 V) which is smaller than V2.

When and after the HEMS 40 detects that the vehicle 10 has completed the preparation for discharge through the CPLT signal line 23, the HEMS 40 closes the discharge side contacts of the charge-discharge switching relay 34 of the plug-in station 30 at step H12, so as to connect the electric power lines 31, 32 with the discharge power lines Ph.

Subsequently, at step H13, the HEMS 40 starts to have the AC/DC converter 42 of the HEMS 40 generate its output.

Meanwhile, the vehicle 10 closes the discharge relay 122b at step S13, and starts to have the DC/AC inverter 122a generate its output at step S14. Those processes described above allow supplying the electric power from the vehicle electric storage device 11 to the external electric load (and/or the electric home appliances, etc.) to the started. In other words, the vehicle electric storage device 11 starts to be discharged.

The HEMS 40 and the vehicle 10 exchange information concerning the output conditions with each other through the PLC communication while the electric power is being supplied from the vehicle electric storage device 11 to the external electric load (i.e., during the discharge) (step H14 and step 615, shown in FIG. 8). It should be noted that the vehicle 10 (in actuality, the first electronic control unit 121c) stops the operation of the DC/AC inverter 122a when the discharge current flowing through the electric power cable 20 exceeds the "obtained permissible current value of the electric power cable 20" during the discharge is being performed, and thereafter, opens the discharge relay 122b if necessary, so as to stop the discharge.

Thereafter, when the HEMS 40 determines that the request for discharge is over (step H15), the HEMS 40 notifies the vehicle 10 of request for stopping discharge through the CPLT signal line 23, at step H16. More specifically, the HEMS 40 makes the CPLT circuit 35 stop the oscillation of the CPLT signal. At this point in time, the voltage (potential) of the CPLT terminal of the inlet 13 (i.e., potential of the connection line C) is V3 (e.g., $ V).

When the vehicle 10 detects the request for stopping discharge from the HEMS 40 at step S16, the vehicle 10 increases (raises) the voltage (potential) of the CPLT terminal of the inlet 13 (i.e., potential of the connection line C) to V2 (e.g., 9 V) in order to enter a state of discharge termination processes, at step S17. It should be noted that the vehicle 10 can end/terminate the discharge. In that case, the vehicle 10 may increase the voltage (potential) of the CPLT terminal of the inlet 13 (i.e., potential of the connection line C) to V2 (e.g., 9 V). Subsequently, the vehicle 10 stops the operation of the DC/AC inverter 122a at step S18.

Subsequently, the vehicle 10 determines whether or not the discharge relay 122b has been welded at step S19 and step 320. Specifically, the vehicle 10 waits for the output voltage of the DC/AC inverter 122a to lower down to a prescribed value after stopping the operation of the DC/AC inverter 122a, then closes one of the contacts of the discharge relay 122b, and opens the other one of the contacts of the discharge relay 122b when the output voltage becomes a value equal to or lower than the prescribed value, while operating the DC/AC inverter 122a. If the output of the voltage sensor 121d of the battery charger 121a increases, the vehicle 10 determines that the relay contact which is opened has been welded.

Thereafter, the vehicle 10 opens the discharge relay 122b at step S21, and makes the PLC unit 123 execute processes to terminate the communication with the PLC unit 33 at step S22. Lastly, the vehicle 10 shuts down the first electronic control unit 121c at step 323 (the vehicle has the unit 121c enter into the sleep state). It should be noted that when the CPLT signal starts to oscillate (i.e., it changes into the duty signal) while the first electronic control unit 121c is in the sleep state, the first electronic control unit 121c boots up again (refer to step H2 and step 32 shown in FIG. 6, step J2 and step T1 shown in FIG. 9).

After the HEMS 40 notifies the vehicle 10 of the request for stopping discharge at step H16 shown in FIG. 8, the HEMS 40 stops the operation of the AC/DC converter 42 of the HEMS 40 at step H17, waits for a discharge circuit voltage (output voltage of the AC/DC converter 42) to lower to a value equal to or lower than a prescribed value at step H18, and opens the discharge side contacts of the charge-discharge switching relay 34 at step H19. Thereafter, the HEMS 40 makes the PLC unit 33 execute processes to terminate the communication with the PLC unit 123 at step H20. Those described are the operations during the discharge using the communication.

<Charging Sequence Using Communication>

The charging sequence using the HEMS 40 will next be described briefly with reference to FIGS. 9 and 10. The HEMS 40 charges the electric storage device 11 using the communication (communication signals) between the PLC unit 33 and the PLC unit 123. This type of charge is also referred to as a "charge (charging) using communication", hereinafter. It should be noted that the charge of the electric storage device 11 which does not depend on the communication is referred to as a "usual charge." A description of the process which has already been described in the description regarding the discharging sequence is simplified or omitted, hereinafter.

Firstly, the user connects the connector 21 of the electric power cable 20 to the inlet 13 of the vehicle 10. A way to detect whether or not the connector 21 is in the complete fitting state is the same as one used in the discharging sequence.

Figure 9:
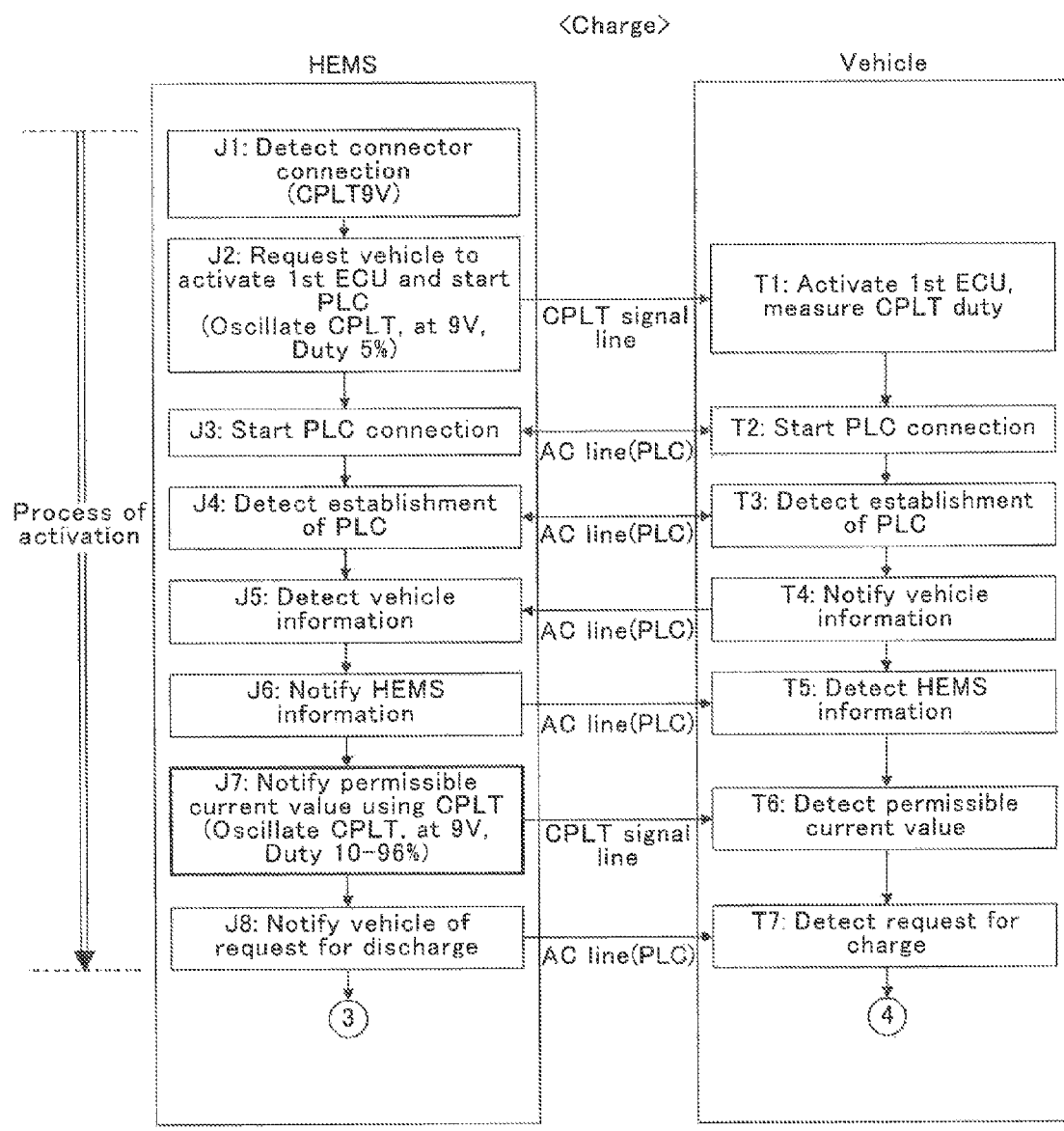
FIG. 9 is a process chart during charging operation of the charge-discharge system shown in FIG. 2.

The HEMS 40 determines that the connector 21 has been connected with the inlet 13 when it detects that the voltage of the receiving side CPLT terminal has dropped from V1 to V2 (e.g., 9 V) at step J1 shown in FIG. 9, oscillates the CPLT signal with a duty cycle 5% at step J2, and sends to the vehicle 10, using the CPLT signal line 23, "the request for starting the PLC communication and the vehicle activating request (first electronic control unit activating request)."

The vehicle 10 activates the first electronic control unit 121c and measures the duty cycle of the CPLT signal, at step T1 shown in FIG. 9. In this case, the duty cycle of the CPLT signal is not within "10% to 96% to indicate the usual charge" which is defined/prescribed in the standard, but is equal to "5% to indicate the charge and discharge using the communication." Accordingly, the vehicle 10 starts the PLC connection at step T2. Simultaneously, the HEMS 40 starts the PLC connection at step J3. After both the HEMS 40 and the vehicle 10 confirm that the PLC connection has been established at step J4 and step T3, respectively, the vehicle 10 notifies the HEMS 40 of the vehicle information through the PLC communication at step T4, similarly to step S5 shown in FIG. 6. The HEMS 40 detects the vehicle information at step J5.

The HEMS 40 notifies the vehicle 10 of the HEMS information through the PLC communication, at step J6. At this point in time, the HEMS information does not include "information concerning a permissible current value of the electric power cable 20," However, the "information concerning the permissible current value of the electric power cable 20" may be included in the HEMS information which is transmitted through the PLC communication, as needed. At step 15, the vehicle 10 detects/obtains the HEMS information.

Subsequently, the HEMS 40 notifies the permissible current value (current rating) of the electric power cable 20 using the CPLT signal, at step J7. In this case as well, the HEMS 40 oscillates the CPLT signal, using the CPLT circuit, in such a manner that the duty cycle of the CPLT signal becomes within the 10% to 96% and is equal to a duty cycle prescribed/predetermined with respect to the permissible current value of the electric power cable 20 in conformity to the standard. In other words, the standard to transmit the "permissible current value of the power charge cable upon the usual request for charge which does not depend on the communication" to the vehicle 10 using the CPLT signal is also used upon the charge based on the request for charge using the communication.

At step T6, the vehicle 10 obtains/detects the permissible current value of the electric power cable 20 by converting the duty cycle of the CPLT signal transmitted/sent through (via) the CPLT signal line 23 into the "permissible current value of the electric power cable 20" in conformity to (or according to) the standard described above. Thereafter, at step J8, the HEMS 40 notifies the vehicle 10 of the request for charge through (using) the PLC communication. At step T7, the vehicle 10 detects the request for charge transmitted through (using) the PLC communication. It should be noted that this process corresponds to a "Yes" determination at step 230 shown in FIG. 7. Thereafter, the vehicle 10 proceeds to step 235 shown in FIG. 7 to execute the processes according to the request for charge through the communication.

Figure 10:
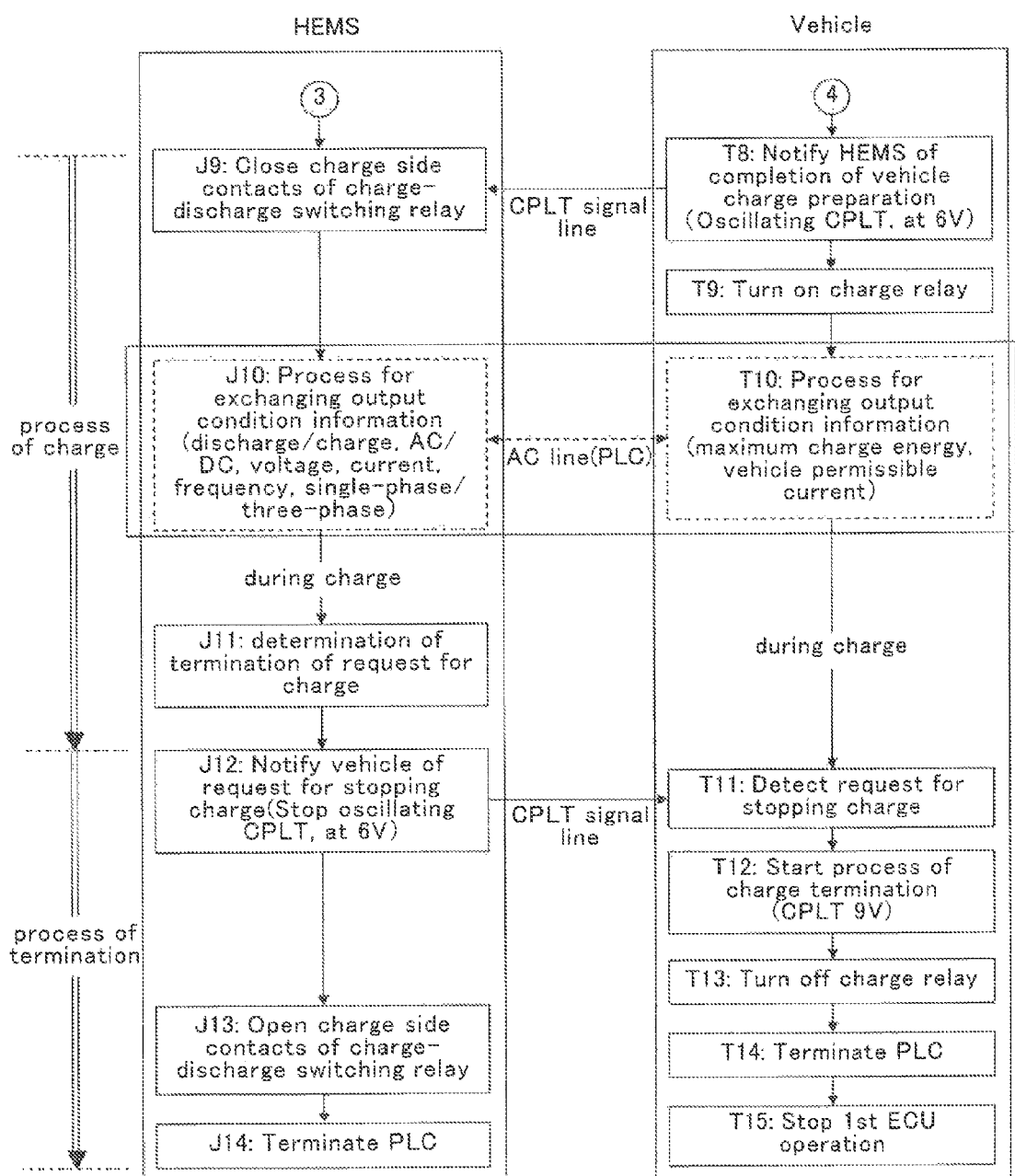
FIG. 10 is a process chart during charging operation of the charge-discharge system shown in FIG. 2.

That is, at step T8 shown in FIG. 10, the vehicle 10 notifies the HEMS 40 of information indicating that the vehicle 10 has completed a preparation for charge using the CPLT signal line 23. In actuality, the first electronic control unit 121c lowers the voltage (potential) at the CPLT terminal (i.e., the potential of the connection line C) to V3 (e.g., 6 V) smaller than V2. Thereafter, the vehicle 10 closes the charge relay 121b of the vehicle 10 at step T9.

When and after the HEMS 40 detects that the vehicle 10 has completed the preparation for charge, the HEMS 40 closes the charge side contacts of the charge-discharge switching relay 34 of the plug-in station 30 at step J9 shown in FIG. 10, so as to connect the electric power lines 31a, 32a with the charge power lines Pj. This starts the charge of the electric storage device 11 by (using) the external power supply. During the charge of the electric storage device 11 using the external power supply, the HEMS 40 and the vehicle 10 exchange information concerning the output conditions with each other through the PLC communication (step J10 and step T10, shown in FIG. 10).

Thereafter, when the HEMS 40 determines that the request for charge is over (step J11), the HEMS 40 notifies the vehicle 10 of request for stopping charge through the CPLT signal line 23 at step J12. More specifically, the HEMS 40 makes the CPLT circuit 35 stop oscillation of the CPLT signal. At this point in time, the voltage (potential) of the CPLT terminal of the inlet 13 (i.e., potential of the connection line C) is V3 (e.g., 6 V).

When the vehicle 10 detects the request for stopping charge from the HEMS 40 at step T11, the vehicle 10 increases (raises) the voltage (potential) of the CPLT terminal of the inlet 13 (i.e., potential of the connection line C) to V2 (e.g., 9 V) in order to enter a state of charge termination processes, at step T12. It should be noted that the vehicle 10 can end/terminate the charge. In that case, the vehicle 10 may increase the voltage (potential) of the CPLT terminal of the net 13 (i.e., potential of the connection line C) to V2 (e.g., 9 V). Subsequently, the vehicle 10 opens the charge relay 121b of the vehicle 10 at step T13, and makes the PLC unit 123 execute processes to terminate the communication with the PLC unit 33 at step T14. Lastly, the vehicle 10 shuts down the first electronic control unit 121c at step T15 (it has the unit 121c enter into the sleep state).

After the HEMS 40 notifies the vehicle 10 of the request for stopping charge at step J12, the HEMS 40 opens the charge side contacts of the charge-discharge switching relay 34 at step J13. Thereafter, the HEMS 40 makes the PLC unit 33 execute processes to terminate the communication with the PLC unit 123 at step J14. In this state in which the first electronic control unit 121c is in the sleep state, when the CPLT signal starts to oscillate again (i.e., it changes into the duty signal), the first electronic control unit 121c boots up again (refer to step H2, and step S2 shown in FIG. 6, step J2 and step T1 shown in FIG. 9). Those described the operation during the charge using the communication.

<Operations During the Charge (Charging Operation) and During the Discharge (Discharging Operation): No. 1>

There will next be described a "charge-discharge changeover control" during the charge and the discharge of the electric storage device 11, which the control unit 12 of the vehicle (in actuality, the CPU of the first electronic control unit 121c) performs.

The CPU of the first electronic control unit 121c (hereinafter, simply referred to as a "CPU") executes a routine shown by a flowchart in FIG. 11 every time a predetermined time elapses during the charging operation and the discharging operation.

Here, the expression of "during the discharging operation" means a period in which the discharge relay 122b is closed and the DC/AC inverter 122a is operating to generate the output. In other words, the expression of "during the discharging operation" means a period in which the electric power from the electric storage device 11 is able to be supplied to the alternate current input-output terminals ACIH and ACIC of the inlet 13. If the discharge is being performed using the communication described above, a period in which the processes between step S15 and step S16 shown in FIG. 8 corresponds to the period during the discharging operation.

It should be noted that the vehicle 10 may include a wireless communication device which is not shown, and may start the discharging operation in response to a request for discharge sent from an "external device other than the HEMS 40" which can communicate with the wireless communication device. That is, when the wireless communication device of the vehicle 10 receives the request for discharge from the external device in a period in which neither the charging operation nor the discharging operation is being performed, the wireless communication device sends information indicating that the request for discharge has been generated to the first electronic control unit 121c. This causes the first electronic control unit 121c to close the discharge relay 122b and operate the DC/AC inverter 122a to start the discharging operation.

In contrast, the expression of "during the charging operation" means a period in which the charge relay 121b is closed and the battery charger 121a is operating to generate the output. In other words, the expression of "during the charging operation" means a period in which the electric power supplied to the alternate current input-output terminals ACIH and ACIC of the inlet 13 is able to be supplied to the electric storage device 11. If the charge is being performed using the communication described above, a period in which the processes between step T9 and step T11 shown in FIG. 10 corresponds to the period during the charging operation.

It should be noted that the vehicle 10 may start the charging operation in response to a request for charge sent from the "external device other than the HEMS 40." That is, when the wireless communication device of the vehicle 10 receives the request for charge from the external device using the wireless communication in a period in which neither the charging operation not the discharging operation is being performed, the wireless communication device sends information indicating that the request for charge has been generated to the first electronic control unit 121c. This causes the first electronic control unit 121c to close the charge relay 121b and operate the battery charger 121a to start the charging operation.

Further, when at least both of the charge relay 121b and the discharge relay 122b are opened, the "charge-discharge stop state" described above is realized. Before the first electronic control unit 121c enters into the sleep state, the unit 121c opens both of the charge relay 121b and the discharge relay 122b, and stops (the operations of) both of the battery charger 121a and the DC/AC inverter 122a.

Figure 11:
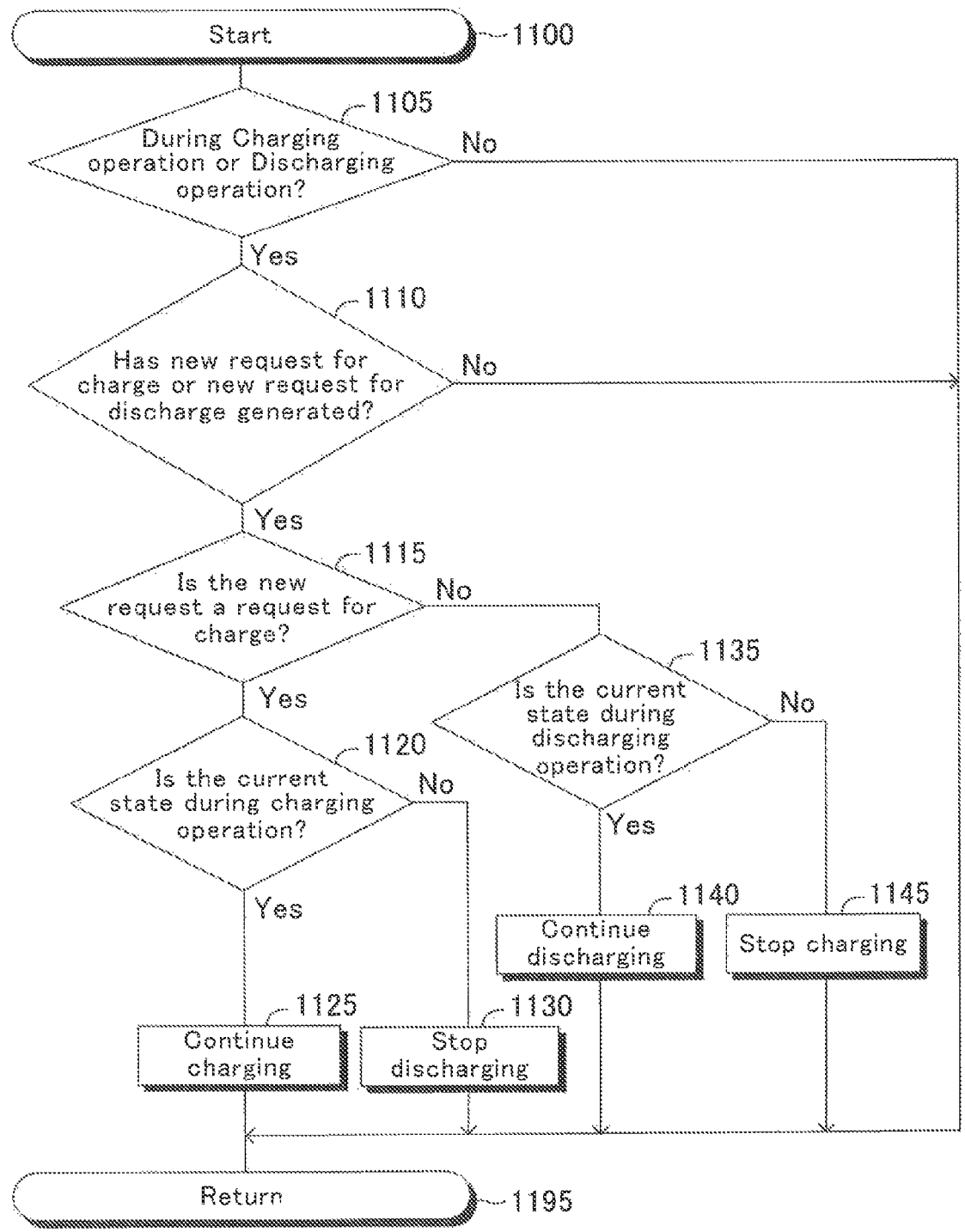
FIG. 11 is a flowchart showing a routine executed by the CPU of the first electronic control unit shown in FIG. 2.

When an appropriate timing comes during the discharging operation and/or the charging operation, the CPU starts to execute a process of step 1100 shown in FIG. 11 to proceed to step 1105, at which the CPU determines whether or not the present point in time is "during the charging operation or during the discharging operation." When neither the charging operation nor the discharging operation is being performed, the CPU makes a "No" determination at step 1105 to directly proceed to step 1195, at which the CPU ends the present routine tentatively.

In contrast, when the present point in time is either during the charging operation or during the discharging operation, the CPU makes a "Yes" determination at step 1105 to proceed to step 1110, at which the CPU determines whether or not a new request for charge or a new request for discharge has been generated. In other words, at step 1110, the CPU determines whether the present point in time is immediately after it newly received the request for charge or the request for discharge.

When neither the new request for charge nor the new request for discharge has been generated, the CPU makes a "No" determination at step 1110 to directly proceed to step 1195, at which the CPU ends the present routine tentatively.

In contrast, when either the new request for charge or the new request for discharge has been generated, the CPU makes a "Yes" determination at step 1110 to proceed to step 1115, at which the CPU determines whether or not the new request is the request for charge.

It is assumed that the new request is the request for charge. In this case, the CPU makes a "Yes" determination at step 1115 to proceed to step 1120, at which the CPU determines whether or not the present point in time is during the charging operation.

When the present point in time is during the charging operation, the CPU makes a "Yes" determination at step 1120 to proceed to step 1125, at which the CPU continues the charging operation. That is, if the charging operation is being performed when the request for charge has been newly generated, the charging operation is continued, since an electric power interference does not occur.

In contrast, if the discharging operation is being performed (i.e. the charging operation is not being performed) when the CPU executes the process of step 1120, the CPU makes a "No" determination at step 1120 to proceed to step 1130, at which the CPU stops the discharging operation to realize the charge-discharge stop state in which neither the charging operation nor the discharging operation is performed. Thereafter, the CPU proceeds to step 1195 to end the present routine tentatively. It should be noted that the CPU executes the processes of "steps from step S16 to step S23" shown in FIG. 8, for example, when the discharging operation is terminated. The HEMS 40 executes the processes of "steps from step H16 to step H20" when the discharging operation is terminated.

If the new request is the request for discharge when the CPU executes the process of step 1115, the CPU makes a "No" determination at step 1115 to proceed to step 1135, at which the CPU determines whether or not the present point in time is during the discharging operation.

When the present point in time is during the discharging operation, the CPU makes a "Yes" determination at step 1135 to proceed to step 1140, at which the CPU continues the discharging operation. That is, if the discharging operation is being performed when the request for discharge has been newly generated, the discharging operation is continued so as not to stop supplying the electric power to the external electric bad which is requiring the electric power from the vehicle 10.

In contrast, if the charging operation is being performed (i.e. the discharging operation is not being performed) when the CPU executes the process of step 1135, the CPU makes a "No" determination at step 1135 to proceed to step 1145, at which the CPU stops the charging operation to realize the charge-discharge stop state in which neither the charging operation nor the discharging operation is performed. Accordingly, since the discharging operation is not performed/started immediately, the occurrence of the electric power interference can be avoided. Thereafter, the CPU proceeds to step 1195 to end the present routine tentatively. It should be noted that the CPU executes the processes of "steps from step T11 to step T15" shown in FIG. 10, for example, when the charging operation is terminated. The HEMS 40 executes the processes of "steps from step J12 to step J14" when the charging operation is terminated.

As described above, when the CPU obtains/receives the new request for charge or the new request for the discharge, the CPU continues the present operation which is being performed if the obtained/received request requires the same operation of the present operation, and the CPU realizes the charge-discharge stop state so as to enter into the sleep state if the obtained/received request requires the operation different from the present operation.

<Operations During the Charge (Charging Operation) and During the Discharge (Discharging Operation): No. 2>

There will next be described anther example of "charge-discharge changeover control" executed by the CPU. In this example, the CPU executes a routine shown by a flowchart in FIG. 12 every time a predetermined time elapses during the charging operation and the discharging operation.

Figure 12:
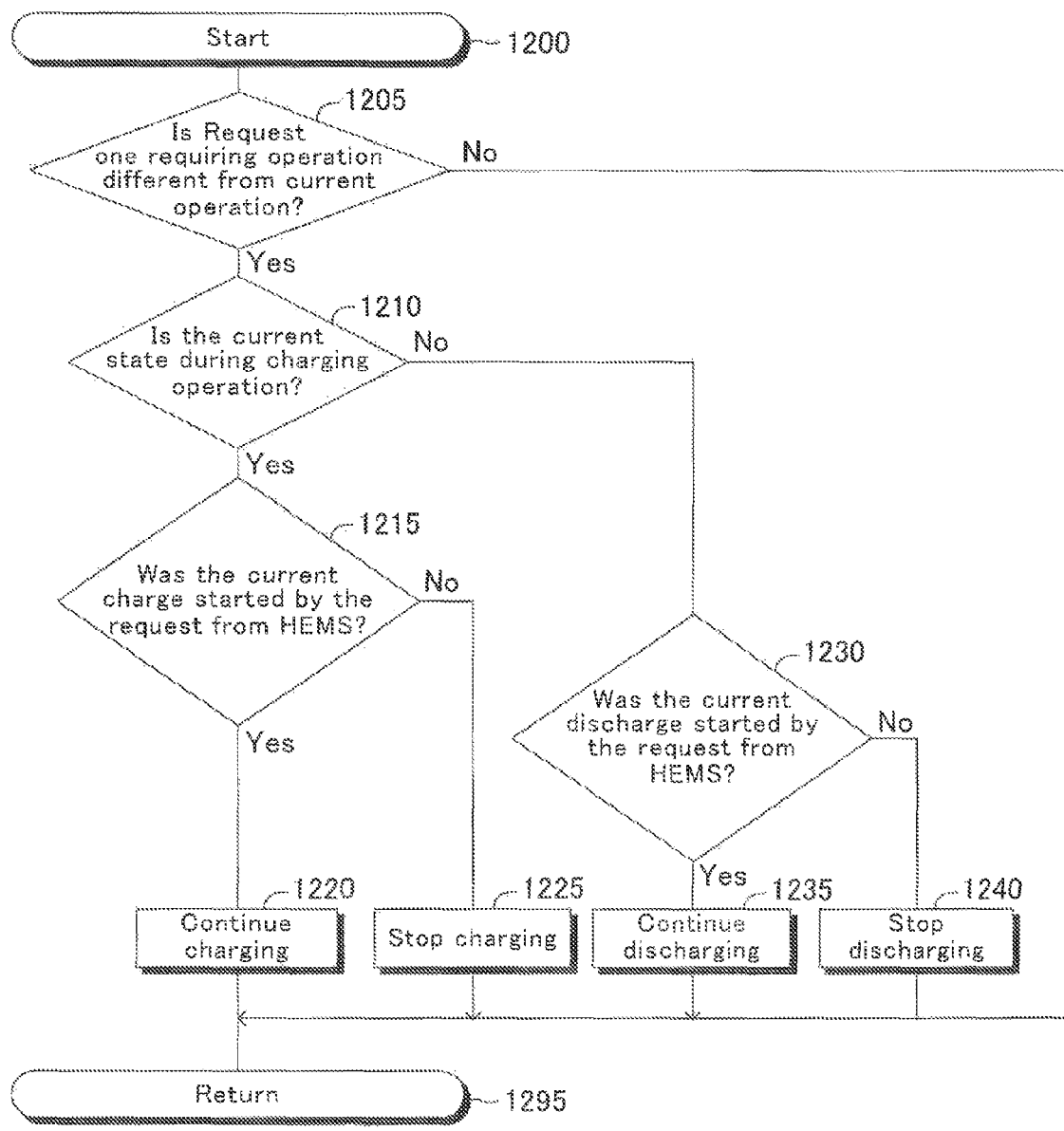
FIG. 12 is a flowchart showing a routine executed by the CPU of a modification of the first electronic control unit shown in FIG. 2.

Accordingly, when an appropriate timing comes, the CPU starts to execute a process of step 1200 shown in FIG. 12 to proceed to step 1205, at which the CPU determines whether or not the request for charge has been obtained during the discharging operation and whether or not the request for discharge has been obtained during the charging operation. In other words, the CPU determines whether or not the new request for discharge has been obtained while the charging operation is being performed at the present point in time at step 1205. Or, the CPU determines whether or not the new request for charge has been obtained while the discharging operation is being performed at the present point in time at step 1205. That is, the CPU determines whether or not the request which requires an operation different from the present/current operation has been obtained.

If the determination result at step 1205 is "No" (negative determination), the CPU proceeds to step 1295 to end the present routine tentatively. Accordingly, the charging operation which is being performed at the present point in time or the discharging operation which is being performed at the present point in time is continued.

In contrast, if the determination result at step 1205 is "Yes" (positive determination), the CPU proceeds to step 1210 to determine whether or not the charging operation is being performed at the present point in time.

It is assumed that the charging operation is presently being performed. In this case, the CPU makes a "Yes" determination at step 1210 to proceed to step 1215, at which the CPU determines whether the present charging operation was started/caused by the "request for charge from the HEMS 40 (i.e., request supplied using the communication through the PLCs" refer to step J9, step T8, and step T9, shown in FIG. 10).

If the present charging operation was started/caused by the "request for charge from the HEMS 40", the CPU makes a "Yes" determination at step 1215 to proceed to step 1220, at which the CPU continues to perform the charging operation. This is because, the HEMS 40 closes a pair of the charge relays of the charge-discharge switching relay 34 so as to supply the electric power from the external power supply (commercial power supply 50) to the alternate current input-output terminals ACIH and ACIC of the inlet 13 (that is, the HEMS 40 realizes an electric power supplying state in which the electric power from the external power supply is capable of being supplied to the vehicle electric storage device 11), if the present charging operation was started/caused based on the "request from the HEMS 40" even when the request for discharge is newly obtained during the charging operation is being performed, and therefore, the electric power interference does not occur even if the charging operation is continued.

In contrast, if the present charging operation was started/caused based on the request other than the "request from the HEMS 40" when the CPU executes the process of the step 1215, the CPU makes a "No" determination at step 1215 to proceed to step 1225, at which the CPU stops the charging operation so as to realize the charge-discharge stop state. Thereafter, the CPU proceeds to step 1295 to end the present routine tentatively.

That is, when the request for discharge is newly obtained/generated during the charging operation, and if the present charging operation was started based on the request for charge other than the "request for charge from the HEMS 40", the CPU realizes/achieves the charge-discharge stop state to wait for a next request.

In contrast, when the present state is in a state during the discharging operation, the CPU makes a "No" determination at step 1210 to proceed to step 1230, at which the CPU determines whether or not the present discharging operation was started/caused by the "request for discharge from the HEMS 40 (i.e., request supplied using the communication through the PLCs)" (refer to FIG. 6, step H12, step H13, and steps from step S12 to step S14, shown in FIG. 8).

If the present discharging operation was started/caused by the "request for discharge from the HEMS 40", the CPU makes a "Yes" determination at step 1230 to proceed to step 1235, at which the CPU continues to perform the discharging operation. This is because, the HEMS 40 closes a pair of the discharge relays of the charge-discharge switching relay 34 so as to supply the electric power supplied between the alternate current input-output terminals ACIH and ACIC of the inlet 13 to the external electric storage device 41 (that is, the HEMS 40 realizes an electric power consuming state in which the electric power from the vehicle electric storage device 11 is capable of being supplied to the external electric load), if the present discharging operation was started/caused based on the "request from the HEMS 40" even when the request for charge is newly obtained during the discharging operation is being performed, and therefore, the discharging operation should be continued.

In contrast, if the present discharging operation was started/caused based on the request other than the "request from the HEMS 40" when the CPU executes the process of the step 1230, the CPU makes a "No" determination at step 1230 to proceed to step 1240, at which the CPU stops the discharging operation so as to realize the charge-discharge stop state. Thereafter, the CPU proceeds to step 1295 to end the present routine tentatively.

That is, when the request for charge is newly obtained/generated during the discharging operation, and if the present discharging operation was started based on the request for discharge other than the "request for discharge from the HEMS 40", the CPU realizes/achieves the charge-discharge stop state to wait for a next request.

As described above, the vehicle 10 comprises:

an electric storage section (11, 124), which can be charged with an electric power supplied from an external power supply (e.g., commercial power supply 50) and can be discharged by supplying an electric power to an external electric load (e.g., external electric storage device 41); and control unit (section) which performs a charging operation to charge the electric storage section using the electric power supplied from the external power supply in response to an obtained request for charge (refer to the first electronic control unit 121c, the battery charger 121a, the charge relay 121b, FIG. 9 and FIG. 10), and performs a discharging operation to supply the electric power from the electric storage section to the external electric load in response to an obtained request for discharge (refer to the first electronic control unit 121c, the discharge relay 122b, the DC/AC inverter 122a, FIG. 6 and FIG. 8).

Further, the control unit is configured so as to stop the charging operation to realize a charge-discharge stop state in which neither the charging operation nor the discharging operation is performed (refer to step 1145 shown in FIG. 11, and step 1225 shown in FIG. 12), when the control unit newly obtains the request for discharge while the charging operation is being performed (refer to steps from step 1105 to step 1115, and step 1135 shown in FIG. 11, or the "Yes" determination at step 1205, the "Yes" determination at step 1210, and the "No" determination at step 1215, shown in FIG. 12).

Accordingly, the occurrence of the electric power interference can be avoided.

Further, the control unit is configured, when the control unit newly obtains the request for discharge during the charging operation (refer to the "Yes" determination at step 1205 and the "Yes" determination at step 1210 shown in FIG. 12), so as to determine whether or not the control unit needs to continue the charging operation (step 1215 shown in FIG. 12), so as to continue the charging operation when it determines that it needs to continue the charging operation (step 1220 shown in FIG. 12), and so as to realize the charge-discharge stop state when it determines that it does not need to continue the charging operation (step 1225 shown in FIG. 12).

Further, when the control unit obtains the request for charge or the request for discharge in the charge-discharge stop state, the control unit is configured so as to start the charging operation or the discharging operation in response to the newly obtained request (refer to FIGS. 6, 7, and 9).

Further, the control unit is configured so as to receive "the request for charge and the request for discharge" from the energy management equipment (HEMS 40) external to (outside of) the vehicle. In addition, the control unit may be configured so as to generate the request for charge when the state of the electric storage section 11 satisfies a predetermined condition (i.e., remaining capacity or SOC becomes equal to or smaller than a predetermined value).

Furthermore, the control unit is configured so as to stop the discharging operation to realize a charge-discharge stop state in which neither the charging operation nor the discharging operation is performed (refer to step 1130 shown in FIG. 11, and step 1240 shown in FIG. 12), when the control unit newly obtains the request for charge while the discharging operation is being performed (refer to steps from step 1105 to step 1115 shown in FIG. 11, and the "No" determination at step 1120, or the "Yes" determination at step 1205, the "No" determination at step 1210, and the "No" determination at step 1230, shown in FIG. 12).

Further, the control unit is configured, when the control unit newly obtains the request for charge during the discharging operation (refer to the "Yes" determination at step 1205 shown in FIG. 12, and the "No" determination at step 1210 shown in FIG. 12), so as to determine whether or not the control unit needs to continue the discharging operation (step 1230 shown in FIG. 12), so as to continue the discharging operation when it determines that it needs to continue the discharging operation (step 1235 shown in FIG. 12), and so as to realize the charge-discharge stop state when it determines that it does not need to continue the discharging operation (step 1240 shown in FIG. 12).

Further, the charge-discharge system CDS includes the HEMS 40 serving as the energy management system, and the plug-in station 30.

The energy management system includes:

an electric power state change section which selectively realizes one of the electric power supplying state and the electric power consuming state (the charge-discharge switching relay 34, the AC/DC converter 42, the DC/AC inverter 43, the computer 45, and the input device 46); and a management section which provides the request for charge or the request for discharge to the control unit of the vehicle, makes the electric power state change section realize the electric power supplying state (step J9 shown in FIG. 10) when it provides the request for charge to the control unit (step J8 shown in FIG. 9), and makes the electric power state change section realize the electric power consuming state (step H12 and step H13, shown in FIG. 8) when it provides the request for discharge to the control unit (step H10 shown in FIG. 6).

Further, the management section of the energy management system is configured so as to provide a request to stop the charging operation to the control unit before providing the request for discharge in a case in which it provides the request for discharge to the control unit after providing the request for charge to the control unit (step J12 shown in FIG. 10), and so as to provide a request to stop the discharging operation to the control unit before providing the request for charge in a case in which it provides the request for charge to the control unit after providing the request for discharge to the control unit (step H16 shown in FIG. 8)

Further, the control unit is configured, when the request for discharge is newly obtained while the charging operation is being performed, so as to continue the charging operation in a case in which the charging operation was started/caused based on (in response to) the request for charge supplied from the management section (steps from step 1205 to step 1215, and step 1220, shown in FIG. 12), and so as to realize the charge-discharge stop state in a case in which the charging operation was started/caused based on (in response to) the request for charge other than the request for charge supplied from the management section (step 1215 and step 1225, shown in FIG. 12).

Further, the control unit is configured, when the request for charge is newly obtained during the discharging operation, so as to continue the discharging operation in a case in which the discharging operation was started/caused based on (in response to) the request for discharge supplied from the management section (step 1205, step 1210, step 1230, and step 1235, shown in FIG. 12), and so as to realize the charge-discharge stop state in a case in which the discharging operation was started/caused based on (in response to) the request for discharge other than the request for discharge supplied from the management section (step 1230, and step 1240, shown in FIG. 12).

Accordingly, the charge-discharge system CDS including the vehicle 10, the plug-in station 30, and the HEMS 40 can avoid the occurrence of the electric power interference even when the vehicle 10 erroneously obtains the request for discharge and the request for charge.

It should be noted that the present invention is not limited to the above-described embodiments, and may be modified in various manners within the scope of the present invention. For example, although the communication between the HEMS 40 and the vehicle 10 is performed using the PLC, the communication may be performed by superimposing a communication signal according to a certain protocol on the control pilot signal on the CPLT signal line 23.

Further, although the charge and the discharge of the vehicle electric storage device 11 are carried out using the AC power, they can be carried out using the DC power. In addition, the plug-in station 30 may be included in the HEMS 40. Furthermore, the charge-discharge switching relay 34 may be disposed in the HEMS 40.

Further, the request for charge or for the discharge that was generated previously using the communication from the HEMS 40 is given a higher priority in the routine shown in FIG. 12, however, the request for charge or for the discharge that was lastly generated using the communication from the HEMS 40 can be given a higher priority compared to the request for charge or for the discharge that was previously generated using the communication from the HEMS 40. In any case, when the discharging operation is switched to the charging operation, the vehicle 10 realizes the charge-discharge stop state.

The invention claimed is:

1. A vehicle comprising:
an electric storage section, which can be charged using an electric power supplied from an external power supply external to said vehicle and which can be discharged by supplying an electric power to an external electric load external to said vehicle; and
a control unit, which performs a charging operation to charge said electric storage section using said electric power supplied from said external power supply in response to an obtained request for charge, and which performs a discharging operation to supply said electric power from said electric storage section to said external electric load in response to an obtained request for discharge;
wherein, said control unit is configured so as to stop said charging operation to realize a charge-discharge stop state in which neither said charging operation nor said discharging operation is performed when said control unit obtains said request for discharge while said charging operation is being performed, and so as to start said discharging operation in response to a newly obtained request when said control unit newly obtains said request for discharge after said charge-discharge stop state is realized.

2. The vehicle according to claim 1, wherein,
said control unit is configured so as to determine whether or not said control unit needs to continue said charging operation when said control unit newly obtains said request for discharge during said charging operation, so as to continue said charging operation when it is determined that said control unit needs to continue said charging operation, and so as to realize said charge-discharge stop state when it is determined that the control unit does not need to continue said charging operation.

3. The vehicle according to claim 1, wherein,
when said control unit newly obtains said request for charge in said charge-discharge stop state, said control unit is configured so as to start said charging operation in response to said newly obtained request.

4. The vehicle according to claim 1, wherein,
said control unit is configured so as to receive said request for charge and said request for discharge from an energy management system external to said vehicle.

5. The vehicle according to claim 4, wherein,
said control unit is configured so as to generate said request for charge based on a state of said electric storage section.

6. A vehicle comprising:
an electric storage section, which can be charged using an electric power supplied from an external power supply external to said vehicle, and which can be discharged by supplying an electric power to an external electric load external to said vehicle; and
a control unit, which performs a charging operation to charge said electric storage section using said electric power supplied from said external power supply in response to an obtained request for charge, and which performs a discharging operation to supply said electric power from said electric storage section to said external electric load in response to an obtained request for discharge;
wherein,
said control unit is configured so as to stop said discharging operation to realize a charge-discharge stop state in which neither said charging operation nor said discharging operation is performed when said control unit obtains said request for charge while said discharging operation is being performed, and so as to start said charging operation in response to a newly obtained request for charge when said control unit newly obtains said request for charge after said charge-discharge stop state is realized.

7. The vehicle according to claim 6, wherein,
when said control unit newly obtains said request for charge during said discharging operation, said control unit is configured so as to determine whether or not said control unit needs to continue said discharging operation, so as to continue said discharging operation when it is determined that said control unit needs to continue said discharging operation, and so as to realize said charge-discharge stop state when it is determined that said control unit does not need to continue said discharging operation.

8. The vehicle according to claim 6, wherein,
when said control unit newly obtains said request for discharge in said charge-discharge stop state, said control unit is configured so as to start said discharging operation in response to said newly obtained request.

9. The vehicle according to claim 6, wherein,
said control unit is configured so as to receive said request for charge and said request for discharge from an energy management system external to said vehicle.

10. The vehicle according to claim 9, wherein,
said control unit is configured so as to generate said request for charge based on a state of said electric storage section.

11. A charge-discharge system including a vehicle, and an energy management equipment, wherein,
said vehicle includes:
an electric storage section, which can be charged using an electric power supplied from an external power supply external to said vehicle, and which can be discharged by supplying an electric power to an external electric load external to said vehicle; and
a control unit, which performs a charging operation to charge said electric storage section using said electric power supplied from said external power supply in response to an obtained request for charge, and which performs a discharging operation to supply said electric power from said electric storage section to said external electric load in response to an obtained request for discharge; and
said energy management equipment includes:
an electric power state change section which selectively realizes one of an electric power supplying state in which said electric power from said external power supply is capable of being supplied to said electric storage section of said vehicle and an electric power consuming state in which said electric power from said electric storage section of said vehicle is capable of being supplied to said external electric load; and
a management section, which provides said request for charge or said request for discharge to said control unit of said vehicle, which makes said electric power state change section realize said electric power supplying state when said management section provides said request for charge to said control unit, and which makes said electric power state change section realize said electric power consuming state when said management section provides said request for discharge to said control unit;

and wherein, said control unit of said vehicle is configured so as to stop said charging operation to realize a charge-discharge stop state in which neither said charging operation nor said discharging operation is performed, when said control unit obtains said request for discharge while said charging operation is being performed, and so as to start said discharging operation in response to a newly obtained request when said control unit newly obtains said request for discharge after said charge-discharge stop state is realized, and so as to stop said charging operation to realize said charge-discharge stop state, when said control unit obtains said request for charge while said discharging operation is being performed, and so as to start said charging operation in response to a newly obtained request when said control unit newly obtains said request for charge after said charge-discharge stop state is realized; and said management section of said energy management equipment is configured so as to provide a request to stop said charging operation to said control unit before providing said request for discharge in a case in which it provides said request for discharge to said control unit after providing said request for charge to said control unit, and so as to provide a request to stop said discharging operation to said control unit before providing said request for charge in a case in which it provides said request for charge to said control unit after providing said request for discharge to said control unit.

12. The charge-discharge system according to claim 11, wherein, said control unit is configured, when said request for discharge is newly obtained during said charging operation, so as to continue said charging operation in a case in which said charging operation was started based on said request for charge supplied from said management section, and so as to realize said charge-discharge stop state in a case in which said charging operation was started based on a request for charge other than said request for charge supplied from said management section.

13. The charge-discharge system according to claim 11, wherein, said control unit is configured, when said request for charge is newly obtained during said discharging operation, so as to continue said discharging operation in a case in which said discharging operation was started based on said request for discharge supplied from said management section, and so as to realize said charge-discharge stop state in a case in which said discharging operation was started based on a request for discharge other than said request for discharge supplied from said management section.

\* \* \* \* \*